US008046684B2

(12) United States Patent
Sumio

(10) Patent No.: US 8,046,684 B2
(45) Date of Patent: Oct. 25, 2011

(54) METHOD AND APPARATUS FOR PROCESSING DATA, PROGRAM, AND STORAGE MEDIUM ON WHICH A COMPUTER-READABLE PROGRAM IS STORED

(75) Inventor: Hiroshi Sumio, Bunkyou-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 734 days.

(21) Appl. No.: 11/124,062

(22) Filed: May 6, 2005

(65) Prior Publication Data

US 2005/0270550 A1 Dec. 8, 2005

(30) Foreign Application Priority Data

Jun. 4, 2004 (JP) ................................. 2004-166944

(51) Int. Cl.
*G06N 3/00* (2006.01)
(52) U.S. Cl. ........................................ 715/273; 715/274
(58) Field of Classification Search .................. 715/229, 715/234, 255, 274, 273
See application file for complete search history.

(56) References Cited

U.S. PATENT DOCUMENTS

| 5,413,419 | A | * | 5/1995 | Oami et al. ..................... 400/61 |
| 5,608,527 | A | * | 3/1997 | Valliant et al. ................ 356/600 |
| 2002/0065849 | A1 | * | 5/2002 | Ferguson et al. ............. 707/513 |
| 2004/0012812 | A1 | | 1/2004 | Shimizu |
| 2004/0145778 | A1 | * | 7/2004 | Aoki et al. .................... 358/1.15 |
| 2004/0177336 | A1 | * | 9/2004 | Kujirai ............................ 717/104 |
| 2005/0038754 | A1 | * | 2/2005 | Geist et al. ...................... 705/64 |

FOREIGN PATENT DOCUMENTS

| CN | 1453697 | 11/2003 |
| JP | 8-314654 A | 11/1996 |
| JP | 10-254679 | 9/1998 |
| JP | 11-024857 | 1/1999 |
| JP | 2003-108337 A | 11/2003 |
| JP | 2003-323512 A | 11/2003 |
| JP | 2004-086448 | 3/2004 |
| JP | 2004-096687 A | 3/2004 |

* cited by examiner

*Primary Examiner* — Kyle Stork
(74) *Attorney, Agent, or Firm* — Canon USA Inc. IP Division

(57) ABSTRACT

In an information processing apparatus including a printer driver, when outputting of data generated by executing an application is requested, an output mode selection is performed to select a first output mode in which to output the data generated by the application without data indicating an revise date/time and a second output mode in which to output the data generated by the application together with the data indicating the revise date/time of the data generated by the application. In accordance with the selection, the printer driver controls outputting of data to a printer in the first output mode in which the data generated by the application is output to the printer without the data indicating the revise date/time or in the second output mode in which the data generated by the application is output to the printer together with the data indicating the revise date/time. This allows the revise date/time to be easily reflected in a printed matter produced by the printer.

3 Claims, 11 Drawing Sheets

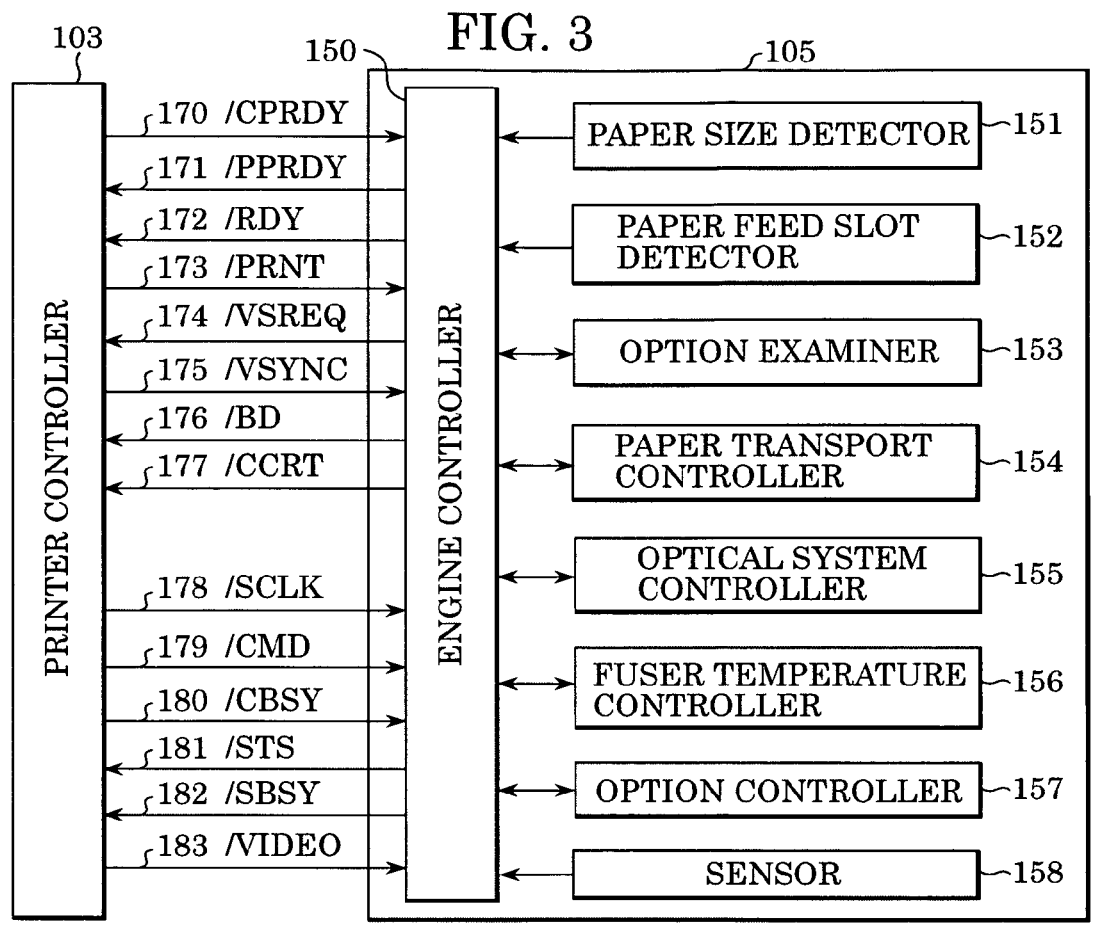
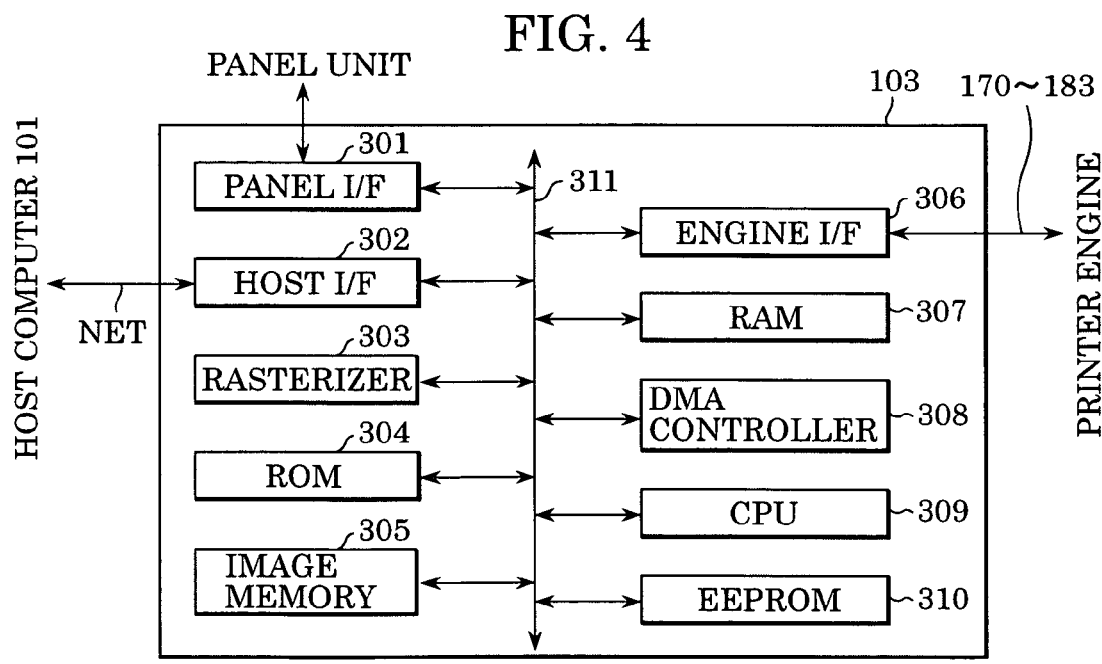

1001

1002 — USER NAME: yamada Taro

1003 — NAME OF DOCUMENT: SPRING EXHIBITION AND SALE

1004 — DOCUMENT UPDATE TIME: 2003/12/03 14:45:05

FIG. 18

STORAGE MEDIUM SUCH AS FD OR CD-ROM

| DIRECTORY INFORMATION |
|---|
| FIRST DATA PROCESSING PROGRAM PROGRAM CODES CORRESPONDING TO STEPS IN FLOW CHART SHOWN IN FIG. 9 |
| SECOND DATA PROCESSING PROGRAM PROGRAM CODES CORRESPONDING TO STEPS IN FLOW CHART SHOWN IN FIG. 14 |
| THIRD DATA PROCESSING PROGRAM PROGRAM CODES CORRESPONDING TO STEPS IN FLOW CHART SHOWN IN FIG. 17 |
| |

METHOD AND APPARATUS FOR PROCESSING DATA, PROGRAM, AND STORAGE MEDIUM ON WHICH A COMPUTER-READABLE PROGRAM IS STORED

BACKGROUND OF THE INVENTION

1. Field of the Invention

The present invention relates to an information processing apparatus including a printer driver capable of producing print information based on an output request from an application and outputting the produced print information to a printing apparatus, and also relates to a data processing method, a storage medium on which a computer-readable program is stored, and a program.

2. Description of the Related Art

When a plurality of users use a single output device for printing, it is necessary to determine which printed matter is of which user. To this end, each time a document of a particular user is printed, the name of the particular user is printed on a banner page by an application or a printer driver to identify the user of the printed document.

However, if a document is printed using another application, it is necessary to again make setting associated with a banner page. The format of the banner page varies depending on the printer driver and the application. The difference in the format of the banner page makes it difficult to quickly determine which document is of which user. To solve the above problem, for example, Japanese Patent Laid-Open No. 8-314654 discloses a technique of printing a banner page in the same format regardless of applications and printer drivers such that a network address of a sender of data is detected, a host file is referred to extract host information according to the network address of the sender, and information identifying a user, such as a host name, is printed on the banner page. After the banner page was printed, the main data of the user is printed.

On the other hand, Japanese Patent Laid-Open No. 2003-108337 discloses a technique of managing printed results or simulation characteristics by printing a color patch in a margin and measuring the color patch using an intensity meter.

However, many users often revise their documents and save revised document data. In this case, it is not sufficient to simply identify users of respective printed documents, but it is necessary to identify versions of printed documents.

To solve the above problem, it has been proposed to automatically print a date/time each document was printed such that the date/time is inserted in the document or printed on a banner page. This technique is known as a time-stamping capability and has been implemented, for example, in Microsoft® Word.

However, in any technique, although it is possible to identify the date/time printing was performed, it is impossible to identify which one of printed documents corresponds to which one of document data stored on computers of users.

Another problem occurs in a printing center that prints documents for many general customers. In such a printing center, it is required to print documents in accordance with original data received from customers without any intentional or unintentional modification. However, it is not known to effectively certify that no modification was made.

Theoretically, it is possible to automatically identify printed documents by scanning printed documents, comparing data obtained by scanning with data stored on computers, and detecting correspondence between printed documents and data stored on computers. However, scanning of printed documents is very inefficient, and thus this technique is not practical.

SUMMARY OF THE INVENTION

In view of the above, the present invention provides an information processing apparatus, a data processing method, a storage medium on which a computer-readable program is stored, and a program, which make it possible to output data in different output modes according to a selection made by a user. That is, when a request for outputting the print data generated by an application is issued, a user is allowed to select a first data output mode in which the data generated by the application is output in a normal manner or a second data output mode in which the data generated by the application is output together with data indicating a revise date/time. In accordance with the selection made by the user in terms of the output mode, data is output to the printing apparatus either in the first data output mode in which the data generated by the application is output without the data indicating the revise date/time or in the second data output mode in which the data generated by the application and the data indicating the revise date/time are output. When data processing is performed such that data is revised from time to time by executing the application, the information processing apparatus allows it to select whether to print the revise date/time together with the data generated by the application such that the revise date/time is reflected in a resultant printed matter, thereby allowing it to easily determine whether the actually printed data is correct data intended to be printed by comparing the revise date/time of the data reflected in the resultant printed matter with the revise date/time of a file in which the data is stored.

The present invention also provides an information processing apparatus, a data processing method, a storage medium on which a computer-readable program is stored, and a program, which make it possible to select whether the revise date/time of main data of a revised version is printed on a page separated from pages of the main data or printed on a page of the main data in an overlaid fashion. When the revise date/time is printed on a separate page, the page may be used as a certification of the contents of the pages of the main data. When the revise date/time is printed on a page of the main data in the overlaid fashion, it is possible to describe the revise date/time without needing an additional sheet, and thus without needing additional cost.

In the information processing apparatus, the data processing method, the storage medium on which a computer-readable program is stored, and the program according to the present invention, when it is selected to reflect the revision date/time of the data of the revised version in the printed result of the data of the revised version, printing is performed such that after the data of the revised version is saved, the date/time the data of the revised version was saved is printed together with the data of the revised version. This makes it possible to prevent the revision date/time of data of a previous version from being employed by mistake as the revision date/time of the data of the revised version, and thus it becomes possible to prevent an incorrect revision date/time from being printed.

More specifically, in one aspect, the present invention provides an information processing apparatus including a printer driver capable of producing print information based on an output request from an application and outputting the produced print information to a printing apparatus, storage means for storing data generated by the application together with data indicating a revision date/time, acquisition means for acquiring the data indicating the revision date/time of the data generated by the application and stored in the storage means, mode selection means for, when outputting of the data generated by the application is requested, selecting a first output mode in which to output the data generated by the application without the data indicating the revision date/time or a second output mode in which to output the data generated by the application together with the data indicating the revision date/time, and control means for controlling generation of data in accordance with a result of the output mode selection such that first print data to be used by the printing apparatus to print the data generated by the application is generated when the first output mode is selected, while second print data to be used by the printing apparatus to print the data generated by the application together with the revise date/time is generated when the second output mode is selected.

In another aspect, the present invention also provides a method of processing data in an information processing apparatus including a printer driver capable of producing print information based on an output request from an application and outputting the produced print information to a printing apparatus and also including storage means for storing data generated by the application together with data indicating a revision date/time, the method including the steps of acquiring the data indicating the revision date/time of the data generated by the application and stored in the storage means, when outputting of the data generated by the application is requested, selecting a first output mode in which to output the data generated by the application without the data indicating the revision date/time or a second output mode in which to output the data generated by the application together with the data indicating the revision date/time, and controlling generation of data in accordance with a result of the output mode selection made in the mode selection step such that first print data to be used by the printing apparatus to print the data generated by the application is generated when the first output mode is selected, while second print data to be used by the printing apparatus to print the data generated by the application together with the revise date/time is generated when the second output mode is selected.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a block diagram showing a control system of the printer shown in FIG. 1.

FIG. 4 is a block diagram showing the structure of a printer controller shown in FIG. 1.

FIG. 18 is a diagram illustrating a memory map of a storage medium that stores various data processing programs readable by a printing system including a host computer (an information processing apparatus) and a printer (a printing apparatus) according to an embodiment of the invention.

DESCRIPTION OF THE EMBODIMENTS

Embodiments of the present invention are described below referring to the accompanying drawings.

First Embodiment

Figure 1:
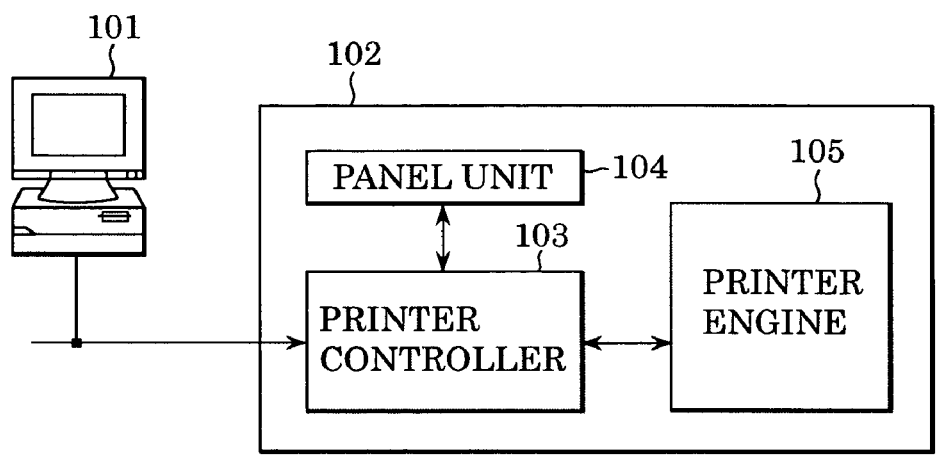
FIG. 1 is a block diagram showing a configuration of a printing system including an information processing apparatus and a printer, according to an embodiment of the invention.

FIG. 1 is a block diagram showing a configuration of a printing system including an information processing apparatus according to a first embodiment of the invention.

The example of the printing system shown in FIG. 1 includes an external device 101 such as a computer serving as a control apparatus for supplying image information and/or controlling a printer, and the printer 102 for outputting an image on a recording medium in accordance with the image information supplied from the external device 101. The printer 102 and the external device 101 are connected with each other via an interface capable of two-way communication. In this printing system according to the present embodiment, a laser beam printer is used as the printer 102, and a host computer (personal computer) is used as the external device 101.

A printer controller 103 produces raster data for each page to be printed in accordance with image information and control information (such as an ESC code, a page description language, etc.) supplied from the external device 101, and sends the resultant raster data to a printer engine 105. Depending on the control code, the printer controller 103 outputs a banner page and then outputs image information.

The printer engine 105 produces a latent image on a photosensitive drum in accordance with the raster data supplied from the printer controller 103 and forms an image on a recording medium by transferring the latent image onto the recording medium and fixing the image.

A panel unit 104 serves as a user interface. A user can issue an operation command by operating the panel unit 104. For example, depending on the status of the printer, a message is displayed on the panel unit 104 to prompt a user to perform calibration. In response to the message, the user can issue a command to perform calibration at a proper time.

Figure 2:
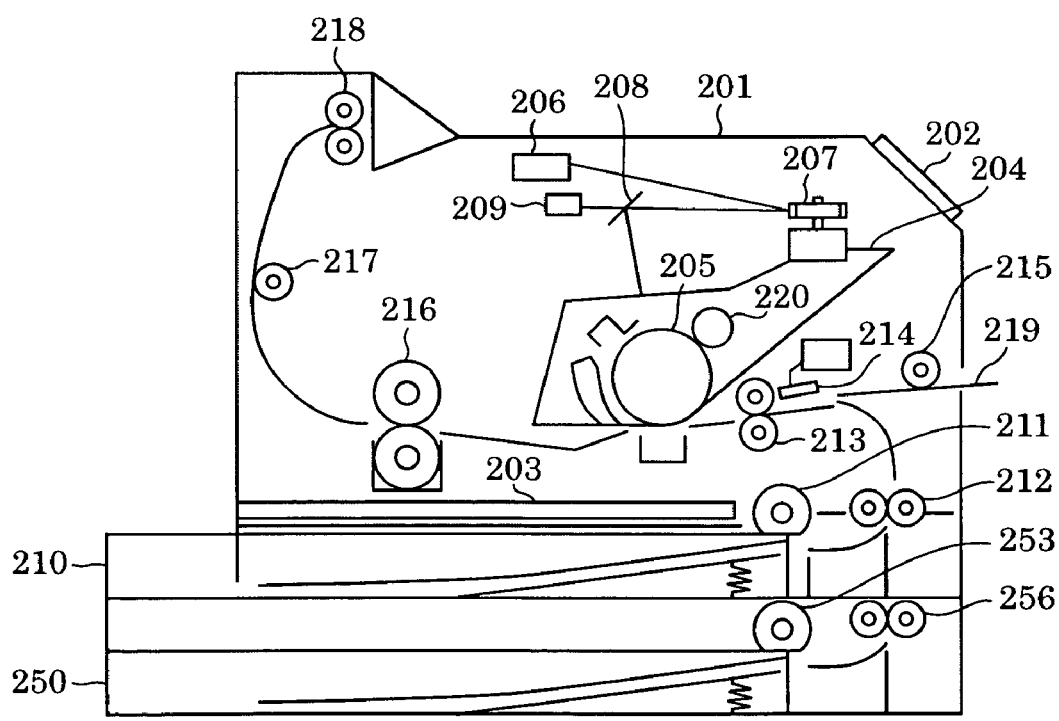
FIG. 2 is a cross-sectional view showing the structure of a printer shown in FIG. 1.

FIG. 2 is a cross-sectional view showing the structure of the printer 102 (for example, a laser beam printer) shown in FIG. 1.

In FIG. 2, reference numeral 201 denotes a printer case. Reference numeral 202 denotes an operation control panel including switches used by a user to issue various commands LED indicators for indicating a status of the printer, and an LCD display for displaying a message or the like. The operation control panel shown herein 202 is an example of the panel unit 104 shown in FIG. 1.

Reference numeral 203 denotes a space in which a board is disposed. More specifically, an electronic circuit board on which the printer controller 103 and the printer engine 104 are implemented is disposed in this space 203. Reference numerals 210 and 250 denote paper cassettes in which to hold paper (recording media). The paper size is electrically detected using a partition plate (not shown).

Reference numerals 211 and 253 denote cassette paper feed clutches having a cam for fetching a sheet of paper on the top of a stack of paper placed on each of the paper cassettes 210 and 250 and transporting the fetched paper to paper feed rollers or 212 or 256 by driving force transmitted from a driving unit (not shown). The cam makes one revolution each time paper is fed. The paper feed rollers 212 feed paper until the leading edge of the paper reaches a registration shutter 214. The paper feed rollers 256 feed paper until the leading edge of the paper reaches the paper feed rollers 212. The registration shutter 214 stops paper by pressing it.

Reference numeral 219 denotes a paper tray for manually feeding paper, and reference numeral 215 denotes a manual feed clutch for feeding paper until the leading edge of the paper reaches the registration shutter 214. Paper to be used to form an image is supplied from a paper feed unit selected from the paper cassettes 210 and 250 and the paper tray 219.

The printer engine 105 communicates with the printer controller 103 using a predetermined communication protocol and selects one paper feed unit from the paper cassettes 210 and 250 and the paper tray 219 in accordance with a command issued by the printer controller 103. In response to a print start command, the printer engine 104 transports paper from the selected paper feed unit to the registration shutter 214. The printer engine 105 includes paper feed units, a mechanism of performing an electrophographic process including forming a latent image, transferring the latent image, and fixing the image, a paper ejection unit, and a control unit for controlling these units and mechanism.

Reference numeral 204 denotes a cartridge including a photosensitive drum 205 and a toner holder. Reference numeral 207 denotes a rotating polygon mirror for scanning a laser beam emitted from a laser unit 206 across the photosensitive drum 205 in a main scanning direction. Reference numeral 208 denotes a reflecting mirror for focusing the laser beam scanned by the rotating polygon mirror 207 onto the photosensitive drum 205.

Reference numeral 209 denotes a beam detector which is disposed at a particular location in a range in which the photosensitive drum 205 is scanned by the laser beam in a sub scanning direction, and which detects the laser beam being scanned and generates a BD signal serving as a timing signal in the main scanning direction.

The registration shutter 214 temporarily stops paper fed from a paper feed unit selected from the paper cassettes 210 and 150 and the paper tray 219. The laser unit 206 emits a laser beam (laser light) by driving a built-in semiconductor laser device in accordance with the raster data supplied from the print controller 103. The emitted laser beam is reflected by the rotating polygon mirror 207 and the reflecting mirror 208 and is focused on the photosensitive drum 205 to form a latent image on the photosensitive drum 205. When the laser beam is reflected by the rotating polygon mirror 207, the laser beam is deflected so that the photosensitive drum 205 is scanned by the laser beam in the main scanning direction.

In synchronization with the emission of the laser beam, the registration shutter 214 is driven upward such that paper on which to form an image is fed in synchronization with the sub scanning of the laser beam. If the beam detector 209, disposed at the position from which the scanning of the laser beams starts, detects the laser beam, the beam detector 209 generates a synchronization signal (BD signal) that determines the timing of writing the image in the main scanning direction. The generated synchronization signal is sent to the printer controller 103.

In the process of transferring the image, the paper on which the image is to be formed is transported by rollers 213, and the photosensitive drum 205 is rotated by a motor (not shown) in a sub scanning direction. The latent image formed on the photosensitive drum 205 is developed by a developing unit 220 into a visual toner image, and transferred to the paper brought into contact with the photosensitive drum 205. The toner image transferred to the paper is then fused by a fuser roller 216. The paper is then transported via a roller 217 and ejected by paper ejection rollers 218 onto an ejection tray on the printer case. The printer 102 may further include an optional cassette or an optional envelope feeder.

FIG. 3 is a block diagram showing a control system of the printer 102 shown in FIG. 1. That is, FIG. 3 shows the configuration of the printer engine 105 and also shows a manner in which the printer controller 103 and the printer engine 105 shown in FIG. 1 are connected to each other via a video interface. In FIG. 3, similar parts to those in FIG. 1 are denoted by similar reference numerals.

In FIG. 3, the printer controller 103 is responsible for communication (including reception of image information) with the external device 101, generation of raster data based on the received image information, and control of the printer engine 105.

An engine controller 150 controls units 151 to 158 in the printer engine 105 in accordance with a control signal supplied from the printer controller 103. The units 151 to 158 are briefly described below. A paper size detector 151 detects the size of paper placed in the paper cassettes 210 and 250 and other optional cassettes (not shown) and notifies the engine controller 150 of the detected paper size.

A paper feed slot detector 152 detects whether the paper cassettes 210 and 250, the paper tray 219, the optional cassette (not shown), and the envelope feeder (not shown) have a paper feed slot, and notifies the engine controller 150 of the detection result.

An option examiner 153 checks whether optional devices such as the envelope feeder are connected. A paper transport controller 154 controls transportation of paper. An optical system controller 155 controls the optical system including a motor that drives the rotating polygon mirror 207 and the laser unit 206.

A fuser temperature controller 156 controls the temperature of the fuser rollers 216. The fuser temperature controller 156 also detects an occurrence of an anomaly in the fuser rollers 216. An option controller 157 controls optional devices such as the optional cassette and the envelope feeder. A sensor unit 158 detects the presence/absence of paper in the transportation path at a registration position, an ejection position, and a turning-around position, and also detects an ambient temperature, the number of printed pages, and a change in an environment (state) such as the amount of remaining toner.

Next, various signals associated with the video interface that connects the printer controller 103 to the engine controller 150 are described below.

A /CPRDY signal 170 indicates that the printer controller 103 is ready to communicate with the engine controller 150. A /PPRDY signal 171 indicates that the engine controller 150 is ready to communicate with the printer controller 103.

A /RDY signal 172 indicates that the engine controller 150 is ready to print. A /PRNT signal 173 is a print request signal transmitted from the printer controller 103 to the engine controller 150. A /VSREQ signal 174 is transmitted from the engine controller 150 to the printer controller 103 to request a vertical sync signal.

A /VSYNC signal 175 is a vertical sync signal returned from the printer controller 103 to the engine controller 150. A /BD signal 176 is a horizontal sync signal transmitted from the engine controller 150 to the printer controller 103.

A /SCLK signal 178 is a clock signal for synchronization in serial communication. A /CMD signal 179 is a command signal transmitted from the printer controller 103 to the engine controller 150. A /CBSY signal 180 functions as a strobe signal in transmission of a command. A STS signal 181 is a response signal (including a signal indicating the internal status of the printer engine 105) returned from the engine controller 150 in response to a command transmitted from the printer controller 103.

A /SBSY signal 182 functions as a strobe signal in returning of a response signal such as a status signal. A VIDEO signal 183 is raster data according to which printing is performed. A /CCRT (Condition Change Report) signal 177 becomes "TRUE" when a change occurs in a state (of states of the printer engine 105) which are not directly concerned in the /RDY signal, that is, which do not affect whether printing is possible. For example, when the ambient temperature, the number of printed pages, or the amount of remaining toner reaches a predetermined value, the /CCRT signal 177 becomes "TRUE".

FIG. 4 is a block diagram showing the structure of the printer controller 103 shown in FIG. 1.

In FIG. 4, a panel interface 301 is responsible for data communication with the panel unit 104. A CPU 309 communicates with the panel unit 104 via the panel interface 301 and interprets a command issued by a user via the panel unit 104.

A host interface 302 bidirectionally connects the printer controller 103 with the external device 101 such as a host computer via a network. An engine interface 306 connects the printer controller 103 with the printer engine 105. The CPU 309 controls the signals 170, 173, 175, 178, 179, and 180 via the engine interface 306 to detect the status of the signals 171, 172, 174, 176, 177, 181, and 182, and thus detect the status of the printer engine 105.

A rasterizer 303 generates raster data to be supplied to the printer engine 105, based on the image information supplied from the external device 101. The generated raster data is temporarily stored in an image memory 305. The CPU 309 controls devices connected to the CPU 309 via a CPU bus 311 in accordance with a control program stored in a ROM 304.

A RAM 307 is used by the CPU 309 to temporarily store data. An EEPROM 310 is a nonvolatile memory used to retain control information such as an intensity correction table. A DMA controller 308 transfers the raster data from the image memory 305 to the engine interface 306, under the control of the CPU 309.

The CPU bus 311 includes an address bus, a data bus, and a control bus. The panel interface 301, the host interface 302, the rasterizer 303, the ROM 304, the image memory 305, the engine interface 306, the RAM 307, the DMA controller 308, the CPU 309, and the EEPROM 310 are connected to the bus 311, and the CPU 309 can access any device connected to the CPU 311.

Figure 5:
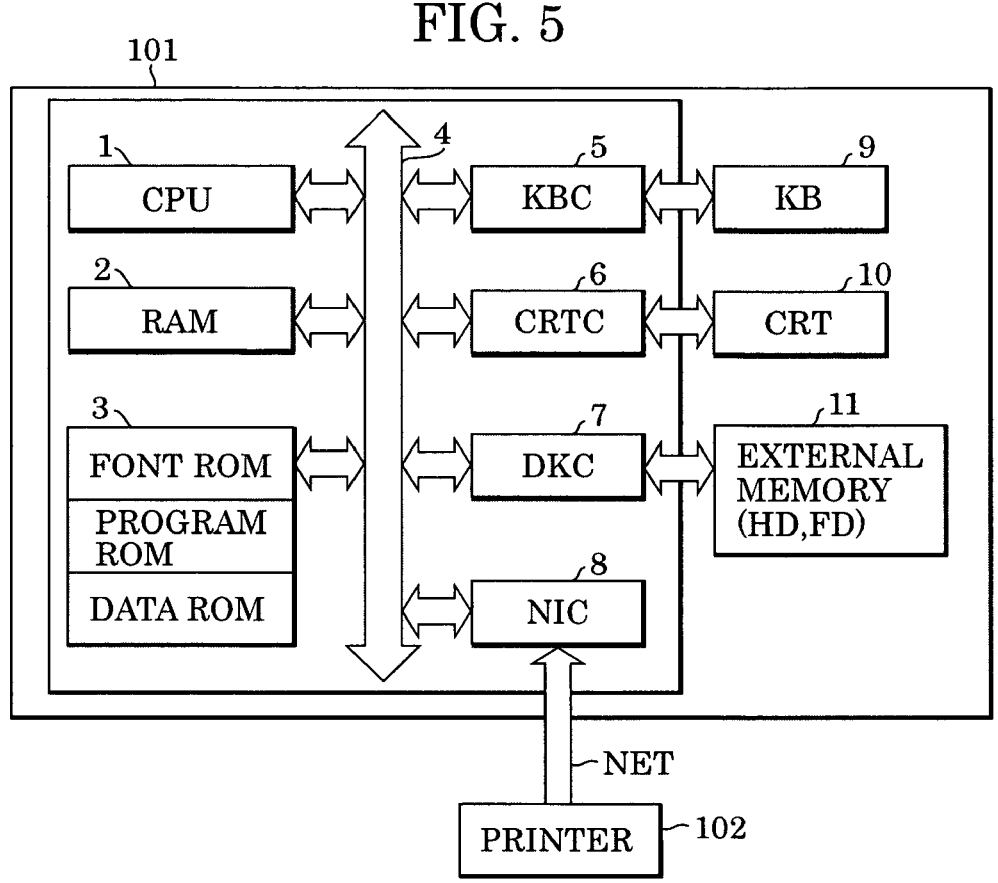
FIG. 5 is a block diagram showing a configuration of an information processing apparatus in a printing system according to an embodiment of the invention.

FIG. 5 is a block diagram showing the configuration of the information processing apparatus (the host computer) in the printing system according to the first embodiment of the invention. In FIG. 5, similar parts to those in FIG. 1 are denoted by similar reference numerals.

In this printing system, the host computer 101 and the printer 102 are connected to each other via a network NET so that they communicate with each other. Note that the host computer 101 and the printer 102 may be connected to each other via another interface instead of the network.

In FIG. 5, the host computer 101 includes a CPU 1. The CPU 1 processes document data including text data, image data, graphical data, a table data (which may include spreadsheet data), etc., and controls various devices connected to a system bus 4 in accordance with a document processing program and/or a print control program (printer driver) stored in a program ROM of a ROM 3 or an external memory 11, according to the present invention.

An operating program (OS) which is a control program of the CPU 1 is stored in the program ROM of the ROM 3 or the external memory 11. Font data used in the processing of a document is stored in a font ROM of the ROM 3 or the external memory 11. Data used in the processing of a document is stored in a data ROM of the ROM 3 of the external memory 11.

A RAM 2 is used by the CPU 1 as a maim memory or a work area. A keyboard controller (KBC) 5 controls an inputting operation of a keyboard (KB) 9 and a pointing device (not shown). A CRT controller (CRTC) 6 controls a displaying operation of a CRT display (CRT) 10. A disk controller (DKC) 7 controls accessing to the external memory 11 in which programs and data such as a boot program, various applications, font data, user files, edit files, and a printer control command generation program (printer driver) are stored. As for the external memory 11, a hard disk (HD) or a floppy disk (FD) may be used.

A network controller (NIC) 8 is connected to the printer 102 via the network NET and serves to control communication between the host computer 101 and the printer 102. The CPU 1 converts (rasterizes) display information stored in the RAM 2 into outline font data so that the display information can be displayed on the CRT 10 in a WYSIWYG (What You See Is What You Get) manner. The CPU 1 also processes various kinds of data on a window opened in accordance with a command issued by operating a mouse cursor displayed on the CRT 10. For example, to perform printing, a user opens a print condition setting window and makes setting of the printer 102 and the printer driver to specify print conditions including a print mode.

Figure 6:
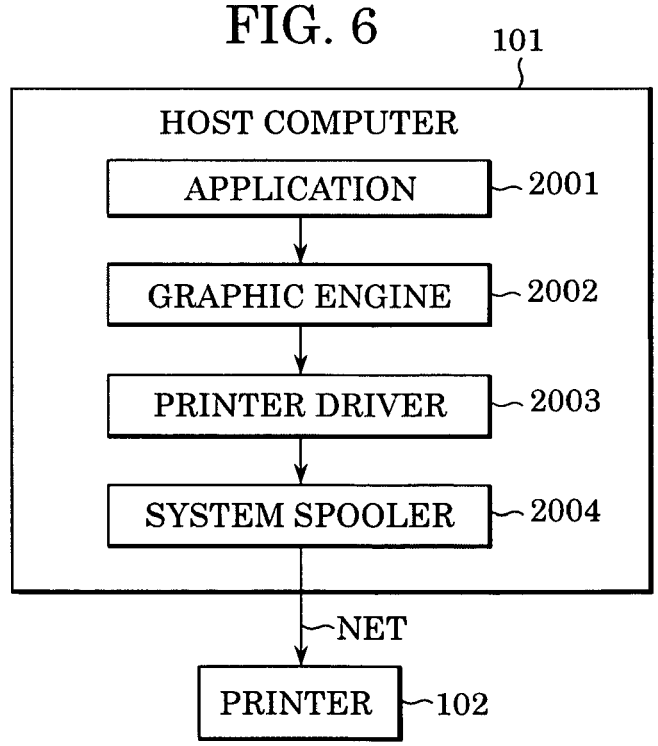
FIG. 6 is block diagram illustrating typical modules associated with a printing process, included in a host computer shown in FIG. 5.

FIG. 6 is block diagram illustrating typical modules associated with the printing process included in the host computer 101 shown in FIG. 5. As described above, the host computer 101 is connected to the printer (the printing apparatus) 102 via the network NET.

In FIG. 6, an application 2001, a graphic engine 2002, a printer driver (print control program) 2003, and a system spooler 2004 are program modules which are loaded into the RAM 2 from the external memory 11 in which the program modules are stored in the form of files, and which are executed by the operating system (OS) and other modules.

Additional applications and/or updated programs of the application 2001 and/or the printer driver 2003 may be stored on the external memory (HD) 11 via an FD, a CD-ROM, or a network (not shown).

When the application 2001 is executed, the application 2001 is loaded into the RAM 2 from the external memory 11. When the application 2001 performs printing using the printer 102, the application 2001 outputs print data using the graphic engine 2002, which is also loaded into the RAM 2 from the external memory 11.

The graphic engine 2002 loads the printer driver 2003, which is specific to the printer 102, into the RAM 2 from the external memory 11 and converts, using the printer driver 2003, the print data received from the application 2001 into printer control commands for controlling the printer 102. The resultant printer control commands are output to the printer 102 via the system spooler 2004 loaded by the OS into the RAM 2 and further via the network NET.

Under the control of the CPU 1, the printer driver 2003 displays a print setting screen (described in further detail later with reference to FIG. 16) on the CRT 10 to allow a user to select a print mode depending on whether to print revise date/time data as well as print data.

As will be described later with reference to FIG. 7, a printing module can be plugged in the application 3001. By executing the plugged-in printing module on the CPU 1, it is possible to display a dialog for setting various printing conditions and control the process of generating print data in accordance with the specified printing conditions, as described below.

That is, when a request for outputting the print data generated by the application is issued, the CPU 1 displays a print dialog to allow a user to select a first data output mode in which the generated print data is output in a normal manner or a second data output mode in which the generated print data is output together with the data indicating the revise date/time acquired by the CPU 1. Depending on the selection made on the print dialog, the CPU 1 outputs data to the printing apparatus either in the first data output mode in which the print data is output or in the second data output mode in which the print data and the revise date/time data are output to the printing apparatus.

Instead of controlling the printing of the revise date/time by the print function provided in the plug-in module, the printer driver may control the printing of the revise date/time as will be described later.

Figure 7:
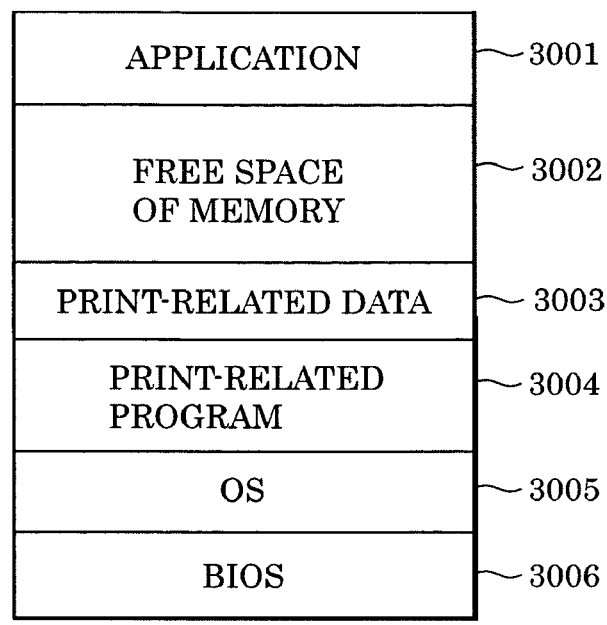
FIG. 7 shows an example of a memory map of a RAM shown in FIG. 5.

FIG. 7 shows an example of a memory map of the RAM 2 shown in FIG. 5, in a state in which program modules associated with printing, including the print control program according to the present embodiment, have been loaded in the RAM 2 of the host computer 101 and the host computer 101 is ready to execute these program modules.

In FIG. 7, reference numeral 3001 denotes an application that performs printing, reference numeral 3002 denotes a free space memory area, reference numeral 3003 denotes data to be printed, reference numeral 3004 denotes a printing program, reference numeral 3005 denotes an OS, and reference numeral 3006 denotes a BIOS. The printer driver (or the plug-in module), which is a print control program according to the present embodiment, is a part of the printing program 3004.

The information processing apparatus according to the present embodiment is described in further detail below with reference to FIG. 8 and other figures.

Figure 8:
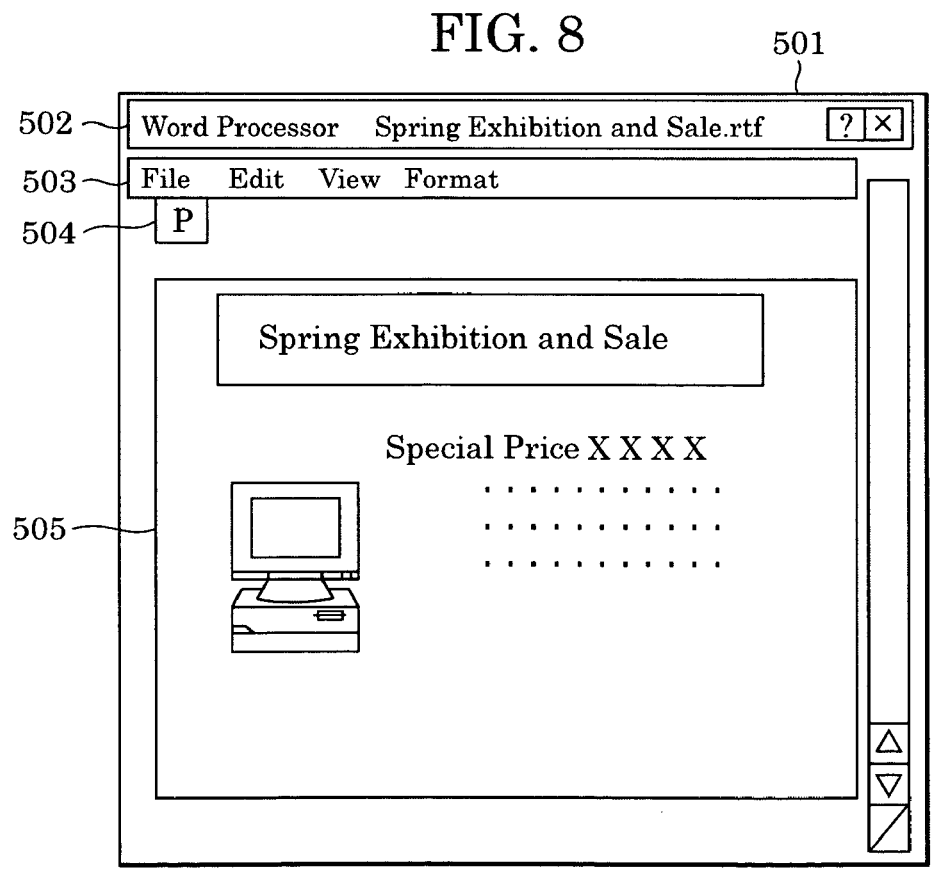
FIG. 8 shows an example of an application edit screen displayed on a CRT 10 shown in FIG. 5.

FIG. 8 shows an example of an application edit screen displayed on the CRT 10 shown in FIG. 5. In this example shown in FIG. 8, the application 3001 displays an application window on the screen of the host computer (information processing apparatus) 101 to edit a document entitled "Spring Exhibition and Sale" to be printed together with a banner page on which the revise date/time of the document is to be printed.

In the present embodiment, the host computer 101 is capable of editing a document and outputting the edited document by executing known application software installed on the host computer 101. FIG. 8 shows an example of a manner in which a document is opened to edit by such known application software.

In FIG. 8, reference numeral 501 denotes the application window, and reference numeral 502 denotes a title bar indicating that a document "Spring Exhibition and Sale.rtf" is opened by a word processor application.

Reference numeral 503 denotes a tool bar of the application software. In the example shown in FIG. 8, the tool bar 503 includes a "File" menu button, an "Edit" menu button", a "View" menu button, and a "Format" menu button, which are common in many known applications and thus a further detailed description thereof is omitted.

Reference numeral 504 denotes an icon of a plug-in printing module. This icon 504 is displayed on the tool bar of the application screen when a printing module stored in a plug-in file is plugged in the application. The details of the plug-in printing module will be described later with reference to a flow chart.

If the icon 504 is selected by operating the keyboard 9 or a pointing device (not shown), the plug-in print module stored in the form of a file is called and executed.

Reference numeral 505 denotes a document opened by the application. The application software is capable of creating a new file, opening an existing file, and saving a file in accordance with selection made by a user via the "File" menu. The "Edit" menu allows a user to perform copying, pasting, and deleting. The "View" menu allows a user to perform switching a view mode between an enlarged mode and a reduced mode. The "Format" menu allows it to perform inserting of a new text string, and specifying of the format/size of a text string. The technique of performing a process in accordance with selection made via a menu is known, and thus a further description thereof is omitted.

Figure 9:
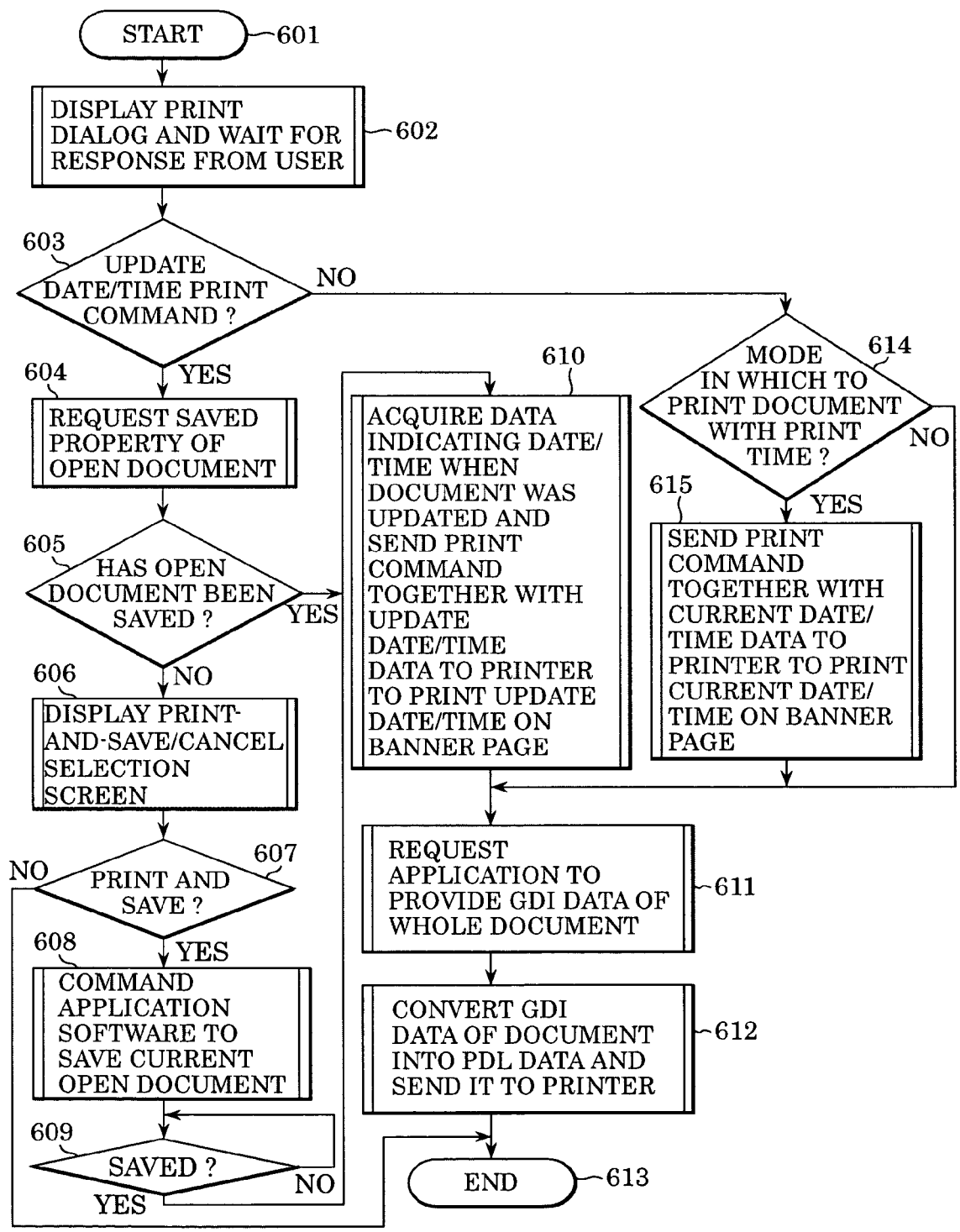
FIG. 9 is a flow chart showing first data processing performed by a host computer (an information processing apparatus) according to an embodiment of the present invention.

FIG. 9 is a flow chart showing first data processing performed by the host computer (information processing apparatus) 101 according to an embodiment of the present invention. This first data processing is performed by a plug-in module included in the printing program 3004 shown in FIG. 7 and incorporated in the application 2001 shown in FIG. 6.

The application software (the application 2001) has the known capability of incorporating a plug-in module. For example, in Microsoft® Office applications, specifications for plug-in modules in the form of COM files are defined. By incorporating a plug-in module in an application, communication between the plug-in module and the application and communication between the plug-in module and the OS become possible.

The first data processing is started in response to clicking on the icon 504 of the plug-in module on the application screen shown in FIG. 8 (step 601). Note that instead of performing the processing described below by the plug-in module, the processing may be included in the process performed by the printer driver 2003. In this case, the processing described below is performed on a user interface screen (print setting screen) of the printer driver 2003, which is opened in response to clicking on a property tab on a standard print setting screen of the OS opened from the application.

Figure 10:
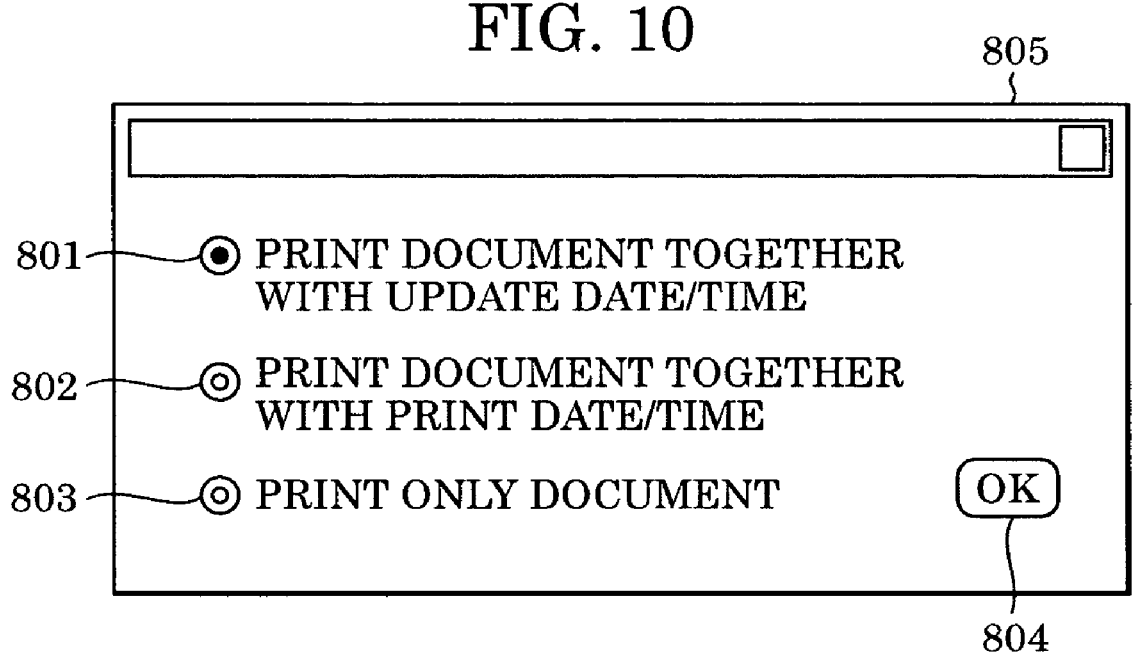
FIG. 10 shows an example of a print dialog displayed on the CRT shown in FIG. 5.

In next step 602, the plug-in software or the printer driver 2003 displays a print dialog shown in FIG. 10 via the operating system and waits for a user to click on an OK button.

FIG. 10 shows an example of the print dialog 805 displayed on the CRT 10 shown in FIG. 5. This print dialog 805 is displayed by the CPU 1 on the CRT 10 in response to clicking on the icon 504.

In FIG. 10, reference numerals 801 to 803 denote print command buttons. Clicking print command button 801 results in printing document data together with the date/time of updating. Clicking print command button 802 results in printing document data together with the date/time of printing. Clicking print command button 803 results in printing only document data. In the specific example shown in FIG. 10, the print command button 801 is highlighted to indicate that the print command button 801 is currently selected.

If an OK button 804 is clicked, the selection specified by one of the print command buttons 801 to 803 is applied.

The print command buttons 801 to 803 are in the form of radio buttons, one of which is allowed to be selected exclusively.

Returning to FIG. 9, in step 603, the plug-in software or the printer driver 2003 determines whether printing of the date/time of updating the document is specified by a user by clicking on the print command button 801. If it is determined that printing of the date/time of updating the document is specified, the process proceeds to step 604. On the other hand, if it is determined that printing of the date/time of updating the document is not specified, the process proceeds to step 614.

In step 604, the plug-in software or the printer driver 2003 requests the application software 2001 to provide a "Saved" property of the document 505 (shown in FIG. 8) being opened. The "Saved" property refers to a flag indicating whether the document has been modified since the last time the document was saved. If the document has not been modified since the last time the document was saved, "true" is returned in response to the request for the "Saved" property. However, if the document has been modified since the last time the document was saved, "false" is returned in response to the request for the "Saved" property.

In the present embodiment, the "Saved" property is managed on the RAM 2 by the application software (the application 2001). This flag is also implemented on a COM object of Microsoft Windows®. The plug-in software or the printer driver 2003 can acquire the "Saved" property using an API.

In step 605, the plug-in software receives the "Saved" property from the application software 2001 and determines whether the document 505 being opened has been saved in a storage device (for example, the external memory 11). If it is determined that the document 505 has been saved, the process proceeds to step 610. In step 610, the plug-in software acquires the date/time of updating the file being opened. The acquisition of the date/time of updating the document (hereinafter, referred to simply as "revise date/time") is possible by using a get_DateModified function. The get_DateModified function is an application DLL (Dynamic Link Library) that allows it to acquire the date/time of updating the document via the OS. In the Win32 API of the Microsoft Windows® OS, GetFileTime( ) is defined. Using this API function (GetFileTime( )), the plug-in software or the printer driver 2003 can acquire the date/time at which the document was updated from the OS. The plug-in software or the printer driver 2003 produces a banner page in which the acquired revise date/time is described, and issues a command to print the banner page. The plug-in software or the printer driver 2003 then produces print data of the document and issues a document to print the produced print data. The banner page data and the print data produced in the above-described manner are transmitted to the printer 102 via the system spooler 2004 and printed by the printer 102.

In a case in which it is determined in step 605 that the document is being processed and has not been saved yet, the document being opened and processed is different from the document stored in the storage device. In this case, the process proceeds to step 606. In step 606, the CPU 1 displays a dialog shown in FIG. 10 on the CRT 10 to allow a user to select a mode in which the document is to be saved and printed.

Figure 11:
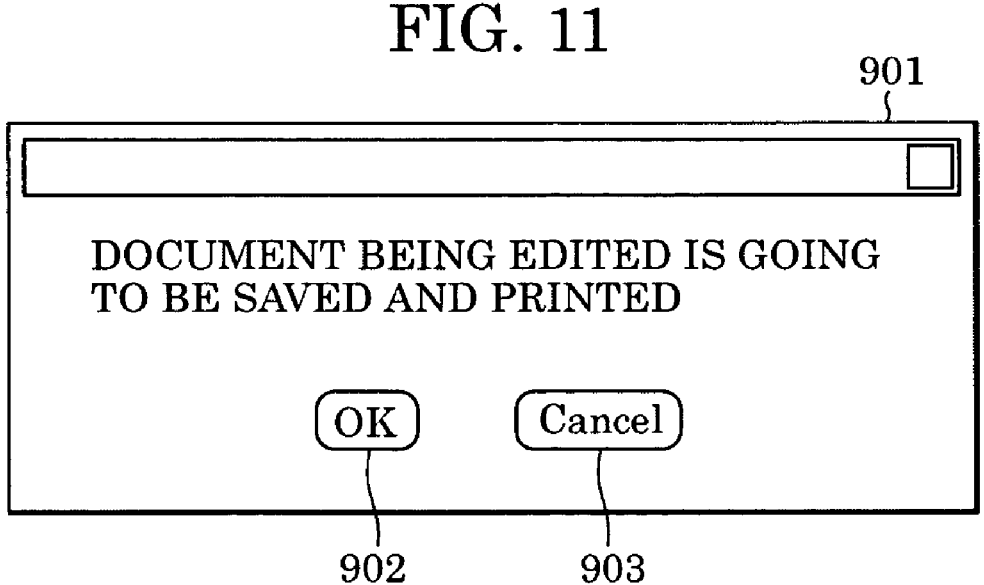
FIG. 11 shows an example of a print dialog displayed on the CRT shown in FIG. 5.

FIG. 11 shows an example of the print dialog which is displayed under the control of the CPU 1 in step 606 on the CRT 10 shown in FIG. 5.

As shown in FIG. 11, on the print dialog displayed in step 606, a message "Document processed is going to be saved and printed" is displayed to prompt a user to determine whether to save and print the document by clicking on an "OK" button 902 or a "Cancel" button 903. If the user decides to save the document and print it, the user clicks on the "OK" button 902, but otherwise the user clicks the "Cancel" button 903.

As described above, the OK button 902 is used to affirmatively answer the dialog, and the Cancel button 903 is used to negatively answer the dialog. Selection of either the OK button 902 or the Cancel button 903 corresponds to the determination carried out in step S607.

If the OK button 902 is clicked, the process proceeds from step S607 to step 608 to save the document 505 in the storage device and print the document. That is, in step 608, the plug-in software or the printer driver 2003 commands the application 2001 to save the current document. The process then proceeds to step 609 and waits for completion of saving the document 505 in the storage device.

On the other hand, if it is determined in step 607 that the Cancel button 903 on the dialog screen shown in FIG. 11 has been clicked, the process proceeds to step 613 to end the present process without performing the print process.

In the case in which it is determined in step 609 that the current document 505 has been saved, the process proceeds to step 610. In step 610, data indicating the last date/time the document 505 was updated is acquired from the application software 2001, and a command to print the revise date/time in the banner page is transmitted to the printer 102 together with the revise date/time data. Alternatively, the printer driver 2003 may produce, using a printer control language, a print data of a banner page including the revise date/time acquired from the application and may transmit the produced print data described in the printer control language to the printer 102.

In the next step 611, GDI (Graphic Device Interface) data (one of formats in which to render a document) of the whole document is transmitted from the application 2001 to the OS, and DDI (Device Driver Interface) function data produced from the GDI data by a rendering unit of the OS is returned to the application 2001. In step 612, the printer driver 2003 converts the received DDI function data to be printed into PDL (Page Description Language) data and transmits the resultant PDL data to the printer 102 via the system spooler 2004.

Thereafter, the process proceeds to step 613, in which the process performed by the plug-in software or the printer driver 2003 ends and the control is returned to the application 2002.

If the user selects, on the dialog screen shown in FIG. 10, to print the document and the date/time when the document is printed, or selects to print only the document, the process proceeds from step 603 to step 614. In this case, in step 614, it is determined whether printing of the document together with the date/time of printing the document is specified (that is, whether the button 802 on the dialog screen shown in FIG. 10 has been selected). If printing of the document together with the date/time of printing the document is specified, the process proceeds to step 615 to send to the printer 102 data indicating the current date/time and a command to print the current date/time in a banner page. Thereafter, in step S611, a request for GDI data of the whole document is sent to the application 2002. In the next step 612, the GDI data of the document is converted into PDL data and transmitted to the printer 102. In step 613, the process performed by the plug-in software ends, and the control of the process is returned to the application software 2001.

In the case in which it is determined in step 614 that printing of the document and the date/time of printing the document has not been selected, that is, if it is determined that printing of only the document is specified (the button 803 on the dialog screen shown in FIG. 10 was selected), the process proceeds to step 611. In step 611, the current document 505 shown in FIG. 8 is printed (DDI data is converted into PDL data) as described above, and the control is returned to the application 2001.

Figure 12:
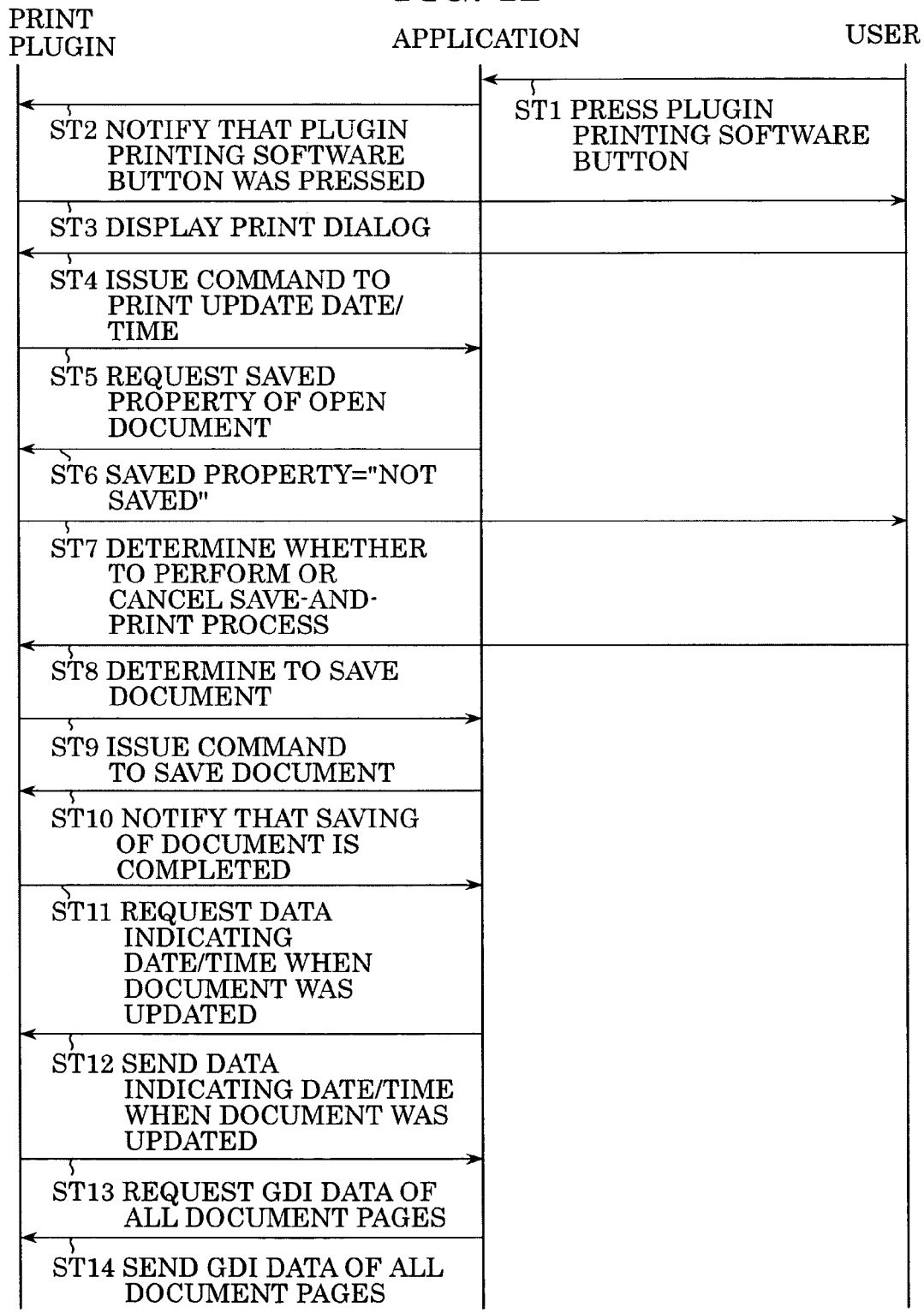
FIG. 12 shows an example of a print session that occurs among plug-in printing software of a host computer (an information processing apparatus), an application, and a user, in accordance with an embodiment of the invention.

FIG. 12 shows a data flow that occurs when a user tries to print the document and the revise date/time before the application saves the modified document. That is, the data flow shown in FIG. 12 among the user, the application software, and the plug-in printing software or the printer driver, when the icon 504 of the plug-in printing software shown in FIG. 8 is clicked and, in response, the plug-in software described above with reference to the flow chart shown in FIG. 9 is called and executed on the computer.

That is, FIG. 12 shows an example of a print session that occurs among the plug-in printing software (the printer driver 2003) of the host computer (information processing apparatus) 101, the application, and the user. The data flow in the print session is described below with reference to FIG. 12 and also the flow chart shown in FIG. 9. In FIG. 12, ST1 to ST14 denote phases of the process in which a request is issued, a notification is sent, a message is displayed, and so on. Note that the plug-in printing software may be replaced with the printer driver 2003.

If the user clicks on the icon 504 of the plug-in printing software on the window (shown in FIG. 8) displayed by the application software, a notification of an occurrence of an event is sent to the application software 2001 in phase ST1.

In phase ST2, the application software 2001 notifies the plug-in printing software that the icon 504 has been selected. In response, the control is transferred to the plug-in printing software, and the plug-in printing software starts the process shown in the flow chart of FIG. 9 from step 601.

In phase ST3 (step 602 in FIG. 9), the print dialog shown in FIG. 10 is displayed on the CRT 10. If the user selects the button 801 on the screen shown in FIG. 10 and further selects the OK button 804, then in phase ST4, a notification of the event that printing of the document and the date/time of updating the document is specified is sent to the plug-in printing software.

When the determination in step 603 in FIG. 9 is affirmatively made as to whether to print the document and the date/time of updating the document, a request for the "Saved" property of the current document is sent to the application software 2001 in phase ST5 (step 604 in FIG. 9). In phase ST6, the "Saved" property indicating that the document has not been saved is returned from the application software, and thus it is determined in step 605 in FIG. 9 that the document has not been saved. In phase ST7 (step 606 in FIG. 9), the dialog shown in FIG. 11 is displayed on the CRT 10 to prompt the user to select whether to save and print the document.

If the user selects the OK button 902 on the screen shown in FIG. 11, a save request is sent to the plug-in printing software in phase ST8. In step 607 in FIG. 9, the determination as to whether to save and print the document is affirmatively made. Next, in phase ST9 (step 608 in FIG. 9), a command is sent to the application to save the current document. If a notification of completion of saving the document is sent in phase ST10, the determination in step 609 in FIG. 9 as to whether the document has been saved is affirmatively made, and the process proceeds to step 610 in FIG. 9. In phase ST11 (step 610 in FIG. 9), a request for data indicating the date/time of updating the current document is sent to the application. In phase ST12 (step 610 in FIG. 9), the data indicating the revise date/time and a command to print the revise date/time are sent from the plug-in printing software to the printer 102.

In phase ST13 (step 611 in FIG. 9), a request for GDI data of the whole document is sent from the plug-in printing software to the application. In phase ST14 (step 611 in FIG. 9), the GDI data of the whole document is sent from the application to the plug-in printing software. In step 612 in FIG. 9, the GDI data of the whole document is converted to PDL data via DDI data and transmitted to the printer 102.

Figures 13, 14:
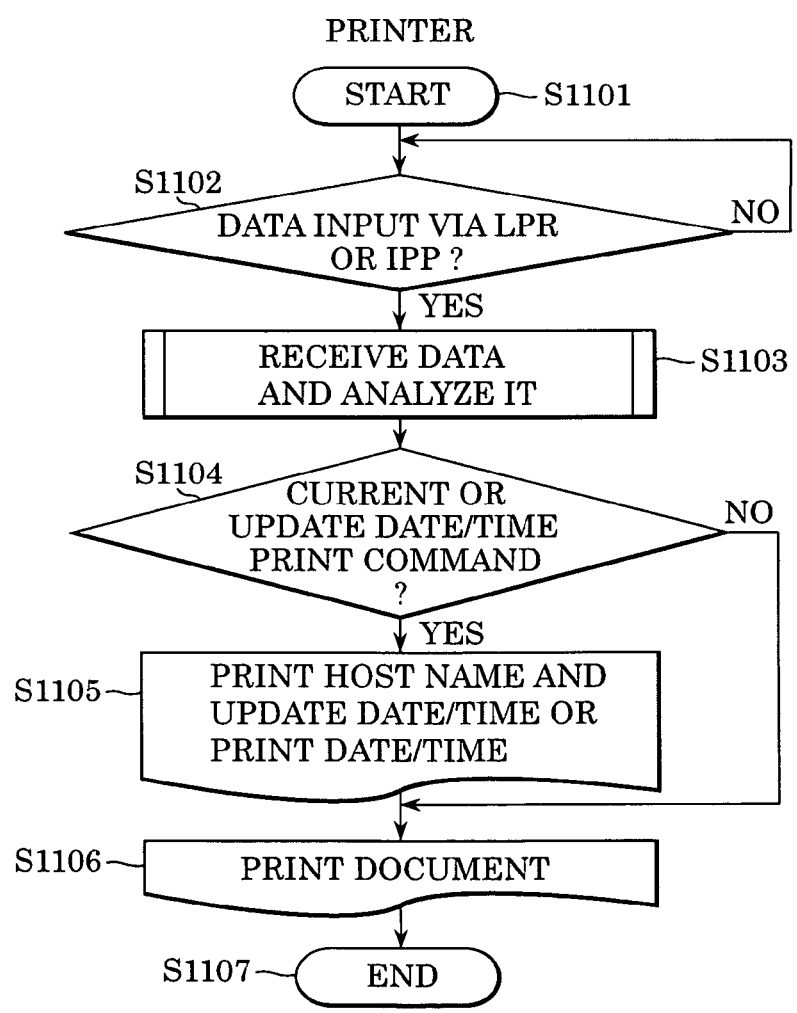
FIG. 13 is a diagram showing an example of a banner page printed by the printer shown in FIG. 1.
FIG. 14 is a flow chart showing first data processing performed by a printer according to an embodiment of the present invention.

FIG. 13 shows an example of a banner page printed by the printer 102 shown in FIG. 1. In this example shown in FIG. 13, the date and time of updating the document are printed in the banner page in response to the execution of step 610 in FIG. 9.

In the example shown in FIG. 13, on a sheet of paper 1001, a banner page including a user name 1002 acquired via a protocol of a network and a document name 1003 and a revise date/time 1004 (at which a document was updated) also acquired via the protocol of the network is printed in a predetermined format. The printing format is not limited to the example shown in FIG. 13, but various formats are possible. For example, if the printer engine is capable of handling colors, colors of the respective items printed on the banner page may be changed depending on importance.

FIG. 14 is a flow chart showing first data processing performed by the printer controller 103 of the printer 102 shown in FIG. 1 according to an embodiment of the present invention. The steps depicted in FIG. 14 are performed by the CPU 309 by executing the control program stored in the ROM 304.

If electric power of the printer 102 is turned on, the printer controller 103 starts the process from step 1101 and performs initialization in a known manner. In step 1102, the CPU 309 checks whether print data has been received from the host computer 101 via the network interface. If it is determined that no print data has been received, the process remains in step 1102 until data is received from the host computer 101.

If it is determined in step 1102 that data has been received from the host computer 101, the process proceeds to step 1103. In step 1103, the CPU 308 analyzes the data received from the host computer 101.

In the next step 1104, the CPU 308 determines whether the received data includes the command to print the date/time of printing the document or the command to print the date/time of updating the document. If neither command is included, the process proceeds to step 1106.

If the CPU 309 determines in step 1104 that the received data includes the command to print the date/time of producing the document or the command to print the date/time of updating the document, the process proceeds to step 1105. In step 1105, the date/time of producing the document or the date/time of updating the document is printed in accordance with the command received from the host computer 101. Next, in step 1106, an image is formed on paper in accordance with the document data being transmitted from the host computer 101. If the printing of the document data is completed, the printing process ends in step 1107 and returns to step 1101.

As described above, the incorporation of the plug-in printing module into the application makes it possible to easily print the last date/time when the document was updated or the date/time when the document was produced, and thus a user can easily recognize when the printed document was updated or produced. By comparing the revise date/time printed on the banner page of the document with the revise date/time recorded on the host computer 101, it is possible to easily determine which data stored on the host computer 101 was printed.

In the case of a printing center where documents are printed using a host computer 101 for customers, customers can determine from the date/time printed on the banner page whether documents have been printed without being modified at the printing center.

Second Embodiment

In the previous embodiment, the revise date/time is printed on the banner page by the printer 102 in accordance with data received from the host computer 101. However, the printing of the revise date/time is not limited to the banner page. In this second embodiment, instead of printing the revise date/time on the banner page, the revise date/time is printed in a particular area of a page of a main document. The details of the second embodiment are described below.

Figure 15:
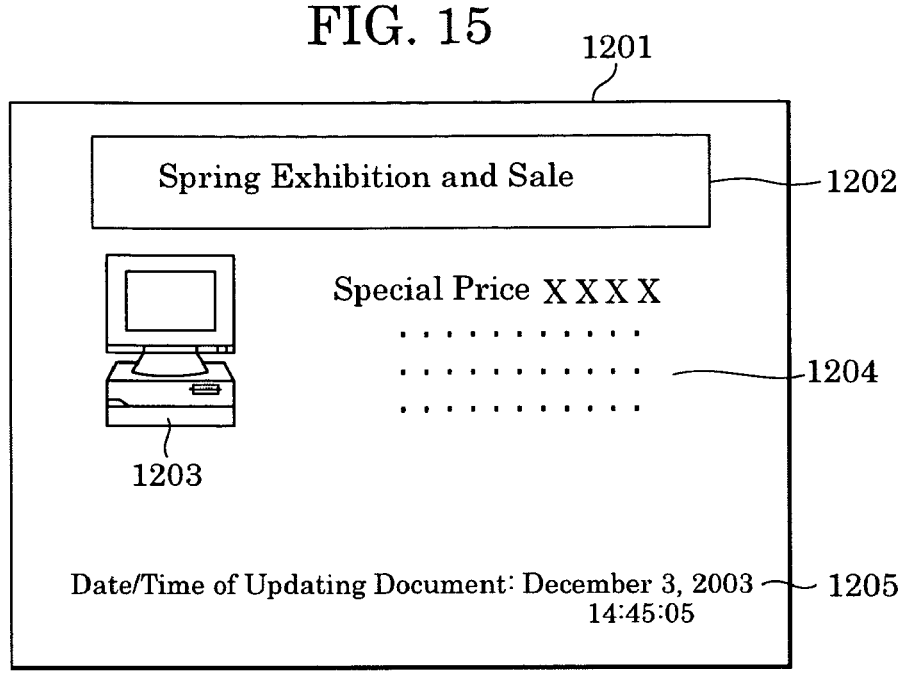
FIG. 15 is a diagram showing an example of a document printed by a printer according to an embodiment of the invention.

FIG. 15 shows an example of a document printed by the printing apparatus according to the second embodiment of the invention. In this example, unlike the first embodiment in which the revise date/time is printed on the banner page, the revise date/time data is embedded in the document data, and the revise date/time is printed in an overlaid manner on paper.

In FIG. 15, reference numeral 1201 denotes the paper on which the document data in which the revise date/time data is incorporated is printed. Reference numerals 1202, 1203, and 1204 denote objects produced by the application software and printed on the page 1201. Reference numeral 1205 denotes the revise date/time incorporated in the document data including the object data rendered by the printer driver 2003 running on the CPU 1 in accordance with the selection made, for example, via the dialog shown in FIG. 10.

As described above, in the present embodiment, the revise date/time is printed in an overlaid fashion on a page of the document edited on the host computer 101.

Third Embodiment

In the previous embodiments, the process of printing the revise date/time is performed by a software module plugged into applications. In this third embodiment, the printer driver is responsible for the process of printing the revise date/time, and no modification is made to the application. The printer driver provides a user interface that allows a user to specify the format in which to print the revise date/time, and the printer driver transmits the revise date/time data produced according to the format specified by the user together with the document data to the printer 102. In accordance with the data received from the printer driver, the printer 102 prints the revise date/time in an overlaid fashion, as shown in FIG. 15, on a page of the document edited on the host computer 101.

Figure 16:
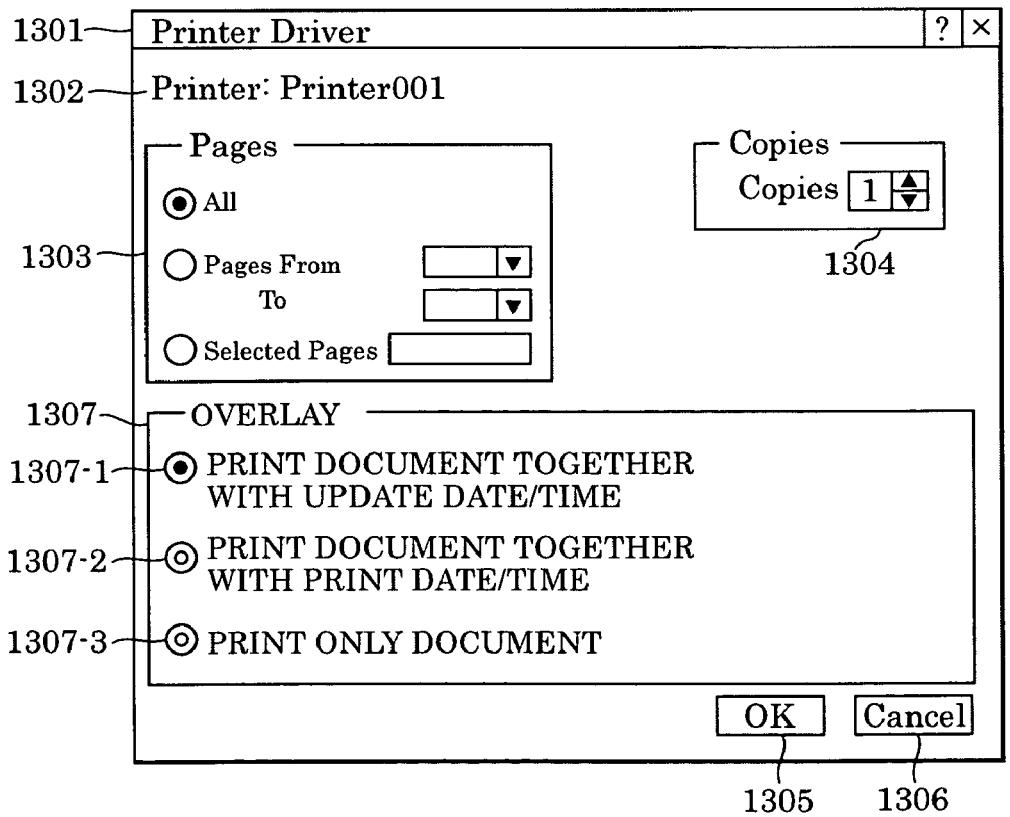
FIG. 16 is a diagram showing an example of a print setting screen displayed on the CRT shown in FIG. 5.

FIG. 16 shows an example of a print setting screen (user interface screen) displayed on the CRT 10 (shown in FIG. 5) by the printer driver stored in the external memory 11 of the host computer 101. This print setting screen (user interface screen) of the printer driver is displayed when "Print" is selected on a "File" menu on the edit screen (shown in FIG. 8) of the application.

In FIG. 16, reference numeral 1301 denotes a title bar indicating that a dialog screen of the printer driver 2003 shown in FIG. 6 is opened. Reference numeral 1302 denotes a printer name indicating that a printer with a name of "Printer001" is currently selected.

Reference numeral 1303 denotes a user interface for specifying pages to be printed. In the example shown in FIG. 16, it is set to print all pages. Reference numeral 1304 denotes a user interface for specifying the number of copies to be printed. In the example shown in FIG. 16, it is specified to print one copy.

Reference numeral 1307 denotes a user interface for selecting a printing mode associated with the date/time overlaid on the document data produced by the application. Reference numeral 1307-1 denotes a selection button for selecting a printing mode (first printing mode) in which data indicating the revise date/time is overlaid on the document data and the resultant data is printed on paper. Reference numeral 1307-2 denotes a selection button for selecting a printing mode (second printing mode) in which data indicating the date/time of printing the document is overlaid on the document data and the resultant data is printed on paper. Reference numeral 1307-3 denotes a selection button for selecting a printing mode (third printing mode) in which only the document data is printed on paper. In the example shown in FIG. 16, the first mode is selected to print the revise date/time in the overlaid fashion.

An OK button 1305 is used to perform printing according to the printing conditions set on the setting screen. A Cancel button 1306 is used to cancel the printing according to the printing conditions set on the setting screen. If the Cancel button 1306 is selected, the CPU 1 returns the screen displayed on the CRT 10 from the print setting screen to the edit screen of the application.

Figure 17:
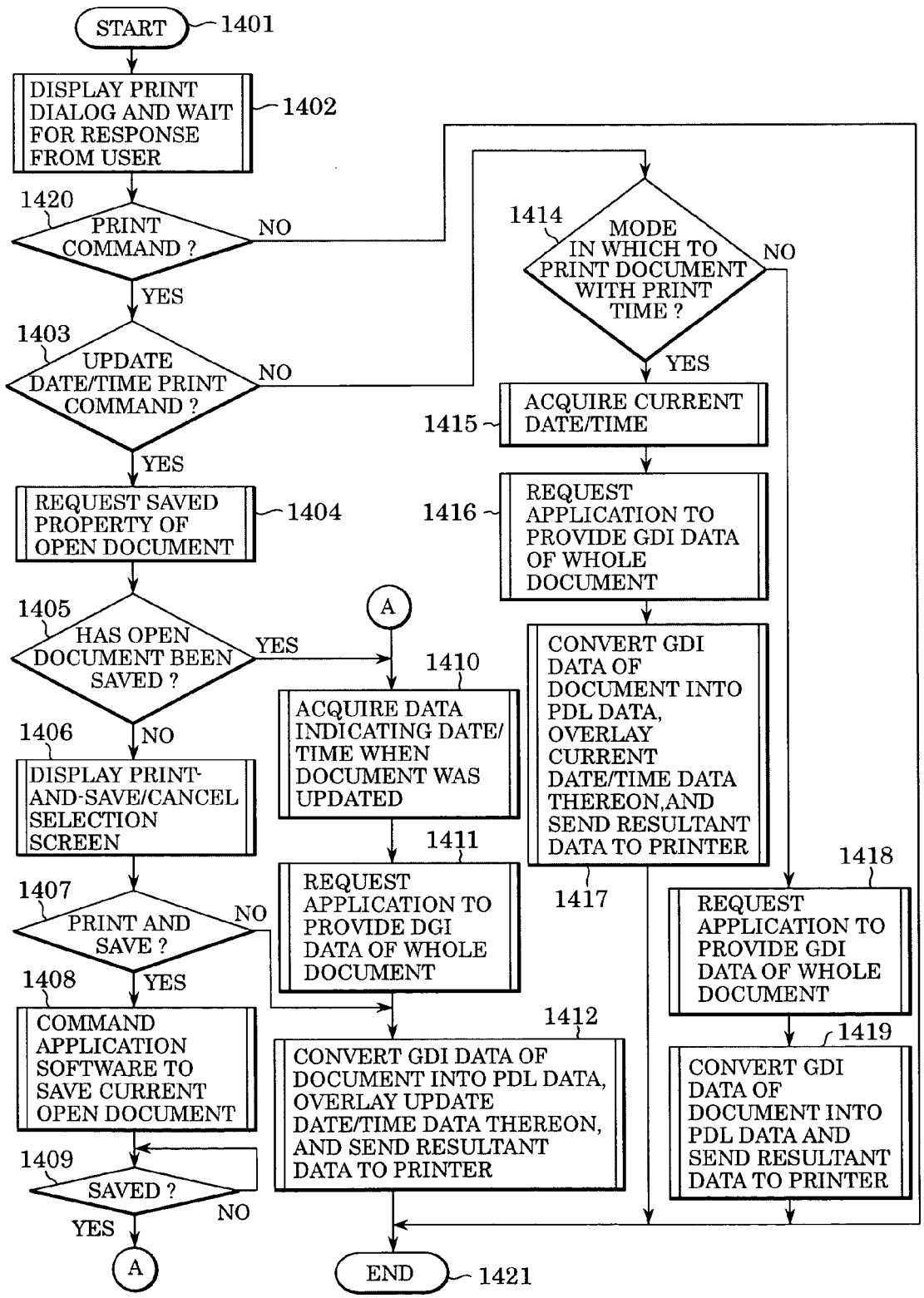
FIG. 17 is a flow chart showing second data processing performed in a host computer (an information processing apparatus) according to an embodiment of the invention.

FIG. 17 is a flow chart showing a second data process (a printing process) performed by the printer driver 2003 (shown in FIG. 6) of the host computer (information processing apparatus 101 according to an embodiment of the invention. The steps depicted in FIG. 17 are performed by the CPU 1 by executing the control program (including the printer driver 2003) stored in the external memory 11.

In this processing, when data generated by the application 2001 is printed via the printer driver 2003, it is selected to whether the revise date/time is printed in an overlaid fashion, the print date/time is printed in an overlaid fashion, or the data generated by the application 2001 without the revise date/time is printed, in accordance with a selection made by a user selecting one of buttons (corresponding to the first to third print modes) on the user interface screen shown in FIG. 16.

On the application screen shown in FIG. 8, if a user selects "Print" in the "File" menu by operating the keyboard 9 or a pointing device (not shown) to print the document being currently opened on the screen, the execution of software on the host computer 101 is switched from the application to the printer driver 2003, and the printer driver 2003 starts the process shown in FIG. 17 from step 1401.

In step 1402, the print driver 2003 displays the print dialog shown in FIG. 16 on the CRT 10 and waits for a command or a response from a user.

In step 1402, if the user selects the OK button 1305 or the Cancel button 1306 on the print dialog shown in FIG. 16, the process proceeds to step 1420. In step 1420, if the printer driver 2003 determines whether the OK button 1305 was selected to issue a print command or if the Cancel button 1306 was selected. If the OK button 1305 was selected, the process proceeds to step 1403. On the other hand, if the Cancel button 1306 was selected, the process jumps to step 1421 and the process ends.

In step 1403, the printer driver 2003 determines whether the user selected the printing mode in which the revise date/time is overlaid on the document data (by selecting the selection button 1307-1). If the printer driver 2003 determines that the user selected the printing mode in which the revise date/time is overlaid on the document data, the process proceeds to step 1404, otherwise the process proceeds to step 1414.

In step 1404, the printer driver 2003 requests the application 2001 to provide the "Saved" property of the current document. In step 1405, the printer driver 2003 determines, from the "Saved" property, whether editing of the current document is completed and the document has been saved. If the printer driver 2003 determines that editing of the current document is completed and the document has been saved (that is, if the answer to step 1405 is affirmative), the process proceeds to step 1410.

On the other hand, if the printer driver 2003 determines in step 1405 that the current document being edited has not been saved, then, in step 1406, the printer driver 2003 (running on the CPU 1) displays the print dialog (shown in FIG. 11) on the CRT 10 to prompt the user to select whether the document is saved and printed or printing of the document is cancelled. The process waits in step 1407 until the user makes a selection.

If it is determined in step S1407 that the user selected to save the document and print it (by selecting the OK button 902), the process proceeds to step 1408.

On the other hand, if the printer driver 2003 determines in step 1407 that the user selected to cancel the printing of the document (by selecting the Cancel button 903), the process proceeds to step 1412.

In step 1408, the printer driver 2003 commands the application software 2001 to save the current document. In step 1409, the printer driver 2003 determines whether the document has been saved. If the document has not been saved, the process waits in step 1409 until the document has been saved.

If the document is saved, then in step 1410, the date/time the document was updated is acquired. Next, in step 1411, the printer driver 2003 commands the application 2001 to transfer GDI data of the whole document to the OS. The rendering unit of the OS converts the GDI data into DDI function data. In step 1412, the printer driver 2003 receives the resultant DDI function data of the whole document. The printer driver 2003 converts the received DDI function data into PDL data to be printed by the printed 102, and transmits the PDL data to the printer 102 together with a command to print the revise date/time in an overlaid fashion. Thereafter, the process proceeds to step 1421, at which point the printing process ends.

In the case in which the printer driver 2003 determines in step 1403 that the button selected by the user is not the button to print the revise date/time, the process proceeds to step 1414. In step 1414, the printer driver 2003 determines whether the user selected, via the user interface screen shown in FIG. 16, to print the date/time of printing the document. If the user selected to print the date/time of printing the document (that is, if the selection button 1307-2 was selected), the process proceeds to step 1415. In step 1415, the printer driver 2003 acquires the current time (hardware time measured according to the BIOS setting). In step 1416, the printer driver 2003 requests the application 2001 to provide GDI data of the whole document. In step 1417, the printer driver 2003 converts the GDI data received from the application 2001 into PDL data and transmits the resultant PDL data to the printer 102 together with a command to print the current time in the overlaid fashion. Thereafter, the process proceeds to step 1421.

If it is determined in step 1414 that the mode in which to print the date/time of printing the document was not selected, it is determined that the mode in which only the document is printed was selected, and the process proceeds to step 1418. In step 1418, the printer driver 2003 requests the application 2001 to provide GDI data of the whole document and receives DDI function data via the OS. In step 1419, the printer driver 2003 converts the GDI data received from the application 2001 via the OS into PDL data, and the printer driver 2003 transmits the resultant PDL data to the printer 102. The process then proceeds to step 1421, where the process ends.

Thus, the revise date/time is printed on the same page of the document generated by the application 2003 in an overlaid fashion as shown in FIG. 15.

As described above, the revise date/time printing capability of the printer driver makes it possible to easily print the last date/time when the document was updated or the date/time when the document was produced, and thus a user can easily recognize when the printed document was updated or produced. By comparing the revise date/time printed on the banner page of the document with the revise date/time recorded on the host computer 101, it is possible to easily determine which data stored on the host computer 101 was printed.

In the case of a printing center where documents are printed using a host computer 101 for customers, customers can determine from the date/time printed on the banner page whether documents have been printed without being modified at the printing center.

In the embodiments described above, information about the revise date/time is described in a form visually recognizable by human users on a banner page or a normal page. However, the form in which the information about the revise date/time is described is not limited to one that is visually recognizable by human users, and any form is applicable as long as the information identifies original data from which printing was performed. For example, the revised date/time may be printed in the form of a bar code on a banner page or a normal page of a printed document so that the revised date/time can be read from the bar code by using a bar code scanner, a corresponding original document stored in the computer may be automatically retrieved, and a result may be displayed.

Referring to a memory map shown in FIG. 18, a configuration of a data processing program readable by the printing system including the information processing apparatus and the printing apparatus according to an embodiment of the invention is described below.

FIG. 18 is a diagram illustrating the memory map of a storage medium that stores various data processing programs readable by the printing system including the information processing apparatus and the printing apparatus, according to the embodiment of the invention.

Note that in addition to information shown in FIG. 18, information for managing the programs stored in the storage medium, such as information indicating the version, a producer, or the like, and/or other additional information, such as icons indicating respective programs, depending on an operating system (OS) that reads the programs may also be stored in the storage medium.

Data associated with respective programs are also managed by directories. A program for installing a program on a computer may also be stored on the storage medium. When a program to be installed is stored in a compressed form, a program for decompressing the program may also be stored on the storage medium.

The functions shown in FIG. 9, 14 or 17 according to the embodiments of the present invention may be realized by installing a program from the outside and executing it on a host computer. In this case, information including the program according to the present invention may be supplied to information apparatuses or an image output apparatus from a storage medium such as a CD-ROM, a flash memory, or an FD, or from an external storage medium via a network.

The objects of the present invention may also be achieved by providing to a system or an apparatus a storage medium having software program code stored thereon for implementing the functions disclosed in the embodiments described above and by reading and executing the program code on a computer (or a CPU or an MPU) disposed in the system or the apparatus.

In this case, the program code read from the storage medium implements the novel functions disclosed in the embodiments described above, and the storage medium on which the program code is stored falls within the scope of the present invention.

Note that there is no specific restriction on the form of programs as long as the programs can implement functions of the embodiments of the invention. Specific examples of forms of programs include an object code, a program executed by an interpreter, and script data executed by an OS.

Storage media which can be used to supply the programs include a floppy disk, a hard disk, an optical disk, a magneto-optical disk, a CD-ROM, a CD-R, a CD-RW, a magnetic tape, a non-volatile memory card, a ROM, and a DVD.

In this case, the program code read from the storage medium implements the functions disclosed in the embodiments described above, and the storage medium on which the program code is stored falls within the scope of the present invention.

The program may also be supplied such that a client computer is connected to an Internet Web site via a browser, and an original computer program according an embodiment of the present invention or a file including a compressed computer program and an automatic installer is downloaded into a storage medium such as a hard disk of the client computer. The program code of the program according an embodiment of the present invention may be divided into a plurality of files, and respective files may be downloaded from different Web sites. Thus, a WWW server, an FTP server and similar servers that provide a program or a file that allows the functions according to an embodiment of the present invention to be implemented on a computer also fall within the scope of the present invention.

The program according to the present invention may be stored in an encrypted form on a storage medium such as a CD-ROM and may be distributed to users. Particular authorized users are allowed to download key information used to decrypt the encrypted program from a Web site via the Internet. The decrypted program may be installed on a computer thereby achieving the functions according to an embodiment of the present invention.

The functions disclosed in the embodiments may be implemented not only by executing the program code on a computer, but part or all of the process may be performed by an operating system or the like running on the computer in accordance with a command issued by the program code. Such implementation of the functions also falls within the scope of the present invention.

The program code stored on the storage medium may be loaded into a memory of an extension card inserted in a computer or into a memory of an extension unit connected to a computer, and part or all of the process may be performed by a CPU disposed on the extension card or the extension unit in accordance with the loaded program code. Such implementation of the functions also falls within the scope of the present invention.

Although the present invention has been described above with reference to specific embodiments, the present invention is not limited to those specific embodiments described above, but various modifications (including combinations of embodiments) are possible.

It will be apparent to those skilled in the art that various modifications are possible without departing from the spirit and scope of the invention. Some examples of possible embodiments are described below.

Embodiment 1

An information processing apparatus including a printer driver capable of producing print information based on an output request from an application and outputting the produced print information to a printing apparatus, including a storage unit (the external memory 11 shown in FIG. 5) for storing data generated by the application together with data indicating a revision date/time, an acquisition unit for acquiring the data indicating the revision date/time of the data generated by the application and stored in the storage unit (for example, the CPU 1 acquires the data indicating the revision date/time from the "Saved" property via the API by executing the printer driver 2003 loaded in the RAM 2 from the external memory 11 or the printing module, which is stored in the external memory 11 and which is plugged in the application), a mode selection unit for, when outputting of the data generated by the application is requested, selecting a first output mode in which to output the data generated by the application without the data indicating the revise date/time or a second output mode in which to output the data generated by the application together with the data indicating the revision date/time (for example, the output mode is selected via the dialog shown in FIG. 10), and a control unit for controlling generation of data in accordance with a result of the output mode selection such that first print data to be used by the printing apparatus to print the data generated by the application is generated when the first output mode is selected, while second print data to be used by the printing apparatus to print the data generated by the application together with the revise date/time is generated when the second output mode is selected (by the CPU 1 in steps 607 to 612 in FIG. 9).

When data processing is performed such that data is revised from time to time by executing the application, the information processing apparatus according to embodiment 1 allows it to select whether to print the revise date/time together with the data generated by the application such that the revise date/time is reflected in a resultant printed matter, thereby allowing it to easily determine whether the actually printed data is correct data intended to be printed by comparing the revise date/time of the data reflected in the resultant printed matter with the revise date/time of a file in which the data is stored.

Embodiment 2

An information processing apparatus according to embodiment 1, further including a determination unit for, when outputting of the data generated by the application is requested, determining whether the data generated by the application is of a revised version and has not been saved (by the CPU 1 in step 605 in FIG. 9), wherein when the second output mode is selected and when the determination unit determines that the data generated by the application has not been saved, the control unit saves the data of the revised version in the storage unit, then, after the data has been saved (by the CPU 1 in step 609 in FIG. 9), acquires newest data indicating the revision date/time via the acquisition unit, and finally outputs the data generated by the application together with the data indicating the revision date/time to the printing apparatus.

In embodiment 2, when the second output mode is selected, printing is performed such the revision date/time of the data of the revised version is reflected in the printed result of the data of the revised version, that is, after the data of the revised version is saved, and printing is performed such that the date/time the data of the revised version was saved is included in the printed matter. This makes it possible to prevent the revision date/time of data of a previous version from being employed by mistake as the revision date/time of the data of the revised version, and thus it becomes possible to prevent an incorrect revision date/time from being printed.

Embodiment 3

An information processing apparatus according to embodiment 1 or 2, further including a process selection unit for, when the second output mode is selected and when the determination unit determines that the data of the revised version generated by the application has not been saved, selecting a first process in which the data of the revised version is saved in the storage unit or a second process in which outputting of the data of the revised version is cancelled, wherein when the first process is selected by the process selection unit, the control unit saves the data of the revised version in the storage unit, then, after the data of the revised version has been saved, acquires newest data indicating the revision date/time from the acquisition unit, and finally outputs the data generated by the application together with the data indicating the revision date/time to the printing apparatus, but when the second process is selected, the control unit cancels outputting of the data of the revised version.

When the first process is selected to reflect the revised date/time of the data of the revised version in the printed result, the data of the revised version is saved, and the revise date/time the data was saved is printed together with the data of the revised version in accordance with the selection made by a user depending on whether the data being generated is of a revised version. This makes it possible to prevent the revision date/time of data of a previous version from being employed by mistake as the revision date/time of the data of the revised version, and thus it becomes possible to prevent an incorrect revision date/time from being printed.

Embodiment 4

An information processing apparatus according to one of embodiments 1 to 3, wherein when the first output mode is selected, the control unit outputs the data of the revised version generated by the application to the printing apparatus regardless of the determination made by the determination unit as to whether the data has been saved, but when the second output mode is selected and when the determination unit determines that the data of the revised version generated by the application has not been saved, the control unit saves the data of the revised version in the storage unit, then, after the data has been saved, acquires newest data indicating the revision date/time via the acquisition unit, and finally outputs the data of the revised version generated by the application together with the data indicating the revision date/time to the printing apparatus.

In embodiment 4, high data processing efficiency can be achieved in the first output mode in which it is not necessary to reflect the revise date/time in the generated data. On the other hand, in the second output mode, after the data of the revised version is saved, printing is performed such that the date/time the data of the revised version was saved is included in the printed matter, thereby allowing it to identify the printed data based on the printed reverse date/time and thus allowing it to determine which data stored in the storage device was printed.

Embodiment 5

An information processing apparatus according to one of embodiments 1 to 4, further including a page selection unit for, when the data generated by the application and the data indicating the revise date/time are output to the printing apparatus, selecting a first page output mode in which the data generated by the application and the data indicating the revise date/time are output on different pages or a second page output mode in which the data generated by the application and the data indicating the revise date/time are output on a same page in an overlaid fashion (the selection is made via the dialog shown in FIG. 16), wherein when the first page output mode is selected by the page selection unit, the control unit outputs data to the printing apparatus so that the data generated by the application and the data indicating the revised date/time are output on different pages, but when the second page output mode is selected in the page output mode selection step, the control unit outputs data to the printing apparatus so that the data generated by the application and the data indicating the revise date/time are output on the same page in the overlaid fashion (steps 1410 to 1412 in FIG. 17).

This information processing apparatus according to embodiment 5 allows it to select whether the revise date/time of main data of the revised version generated by the application is printed on a page separated from pages of the main data or printed on a page of the main data in an overlaid fashion. When the revise date/time is printed on a separate page, the page may be used as a certification of the contents of the pages of the main data. When the revise date/time is printed on a page of the main data in the overlaid fashion, it is possible to describe the revise date/time without needing an additional sheet, and thus without needing additional cost.

Embodiment 6

An information processing apparatus according to one of embodiments 1 to 5, wherein the control unit represents the data indicating the revise date/time in a readable form and outputs the resultant data to the printing apparatus.

More specifically, the revise date/time is described in characters, a bar code, or a recognizable image code.

Embodiment 7

A method of processing data in an information processing apparatus including a printer driver capable of producing print information based on an output request from an application and outputting the produced print information to a printing apparatus and also including a storage unit for storing data generated by the application together with data indicating a revision date/time, the method including the steps of acquiring the data indicating the revision date/time of the data generated by the application and stored in the storage unit (step 610 in FIG. 9), when outputting of the data generated by the application is requested, selecting a first output mode in which to output the data generated by the application without the data indicating the revise date/time or a second output mode in which to output the data generated by the application together with the data indicating the revision date/time (step 606 in FIG. 9), and controlling generation of data in accordance with a result of the output mode selection made in the mode selection step such that first print data to be used by the printing apparatus to print the data generated by the application is generated when the first output mode is selected, while second print data to be used by the printing apparatus to print the data generated by the application together with the revise date/time is generated when the second output mode is selected (the first output processing including steps 603 to 611 and 612 in FIG. 9, and the first output processing including steps 604 to 612 in FIG. 9).

When data processing is performed such that data is revised from time to time by executing the application, the method of processing data according to embodiment 7 allows it to select whether to print the revise date/time together with the data generated by the application such that the revise date/time is reflected in a resultant printed matter, thereby allowing it to easily determine whether the actually printed data is correct data intended to be printed by comparing the revise date/time of the data reflected in the resultant printed matter with the revise date/time of a file in which the data is stored.

Embodiment 8

A method of processing data according to embodiment 7, further including the step of, when outputting of the data generated by the application is requested, determining whether the data generated by the application is of a revised version and has not been saved (step 605 in FIG. 9), wherein the control step controls the generation of data such that when the second output mode is selected and when it is determined in the determination step that the data of the revised version generated by the application has not been saved, the data of the revised version is saved in the storage unit, then, after the data has been saved, newest data indicating the revision date/time acquired in the acquisition step from the storage unit is acquired, and finally the data generated by the application is output together with the data indicating the revision date/time to the printing apparatus.

In this method of processing data according to embodiment 8, when the second output mode is selected, printing is performed such the revision date/time of the data of the revised version is reflected in the printed result of the data of the revised version, that is, after the data of the revised version is saved, and printing is performed such that the date/time the data of the revised version was saved is included in the printed matter. This makes it possible to prevent the revision date/time of data of a previous version from being employed by mistake as the revision date/time of the data of the revised version, and thus it becomes possible to prevent an incorrect revision date/time from being printed.

Embodiment 9

A method of processing data according to embodiment 7 or 8, further including the step of, when the second output mode is selected and when it is determined in the determination step that the data of the revised version generated by the application has not been saved, selecting a first process in which the data of the revised version is saved in the storage unit or a second process in which outputting of the data of the revised version is cancelled (step 608 in FIG. 9), wherein the control step controls the generation of data such that when the first process is selected in the process selection step, the data of the revised version is saved in the storage unit, then, after the data of the revised version has been saved, newest data indicating the revision date/time acquired in the acquisition step from the storage unit is acquired, and finally the data generated by the application is output together with the data indicating the revision date/time to the printing apparatus, but when the second process is selected, the control unit cancels outputting of the data of the revised version.

In this method of processing data according to embodiment 9, when the second output mode is selected, printing is performed such the revision date/time of the data of the revised version is reflected in the printed result of the data of the revised version, the data of the revised version is saved, and the revise date/time the data was saved is printed together with the data of the revised version in accordance with the selection made by a user. This makes it possible to prevent the revision date/time of data of a previous version from being employed by mistake as the revision date/time of the data of the revised version, and thus it becomes possible to prevent an incorrect revision date/time from being printed.

Embodiment 10

A method of processing data according to one of embodiments 7 to 9, wherein when the first output mode is selected, the control step control generation of data such that the data of the revised version generated by the application is output to the printing apparatus regardless of the determination made by the determination unit as to whether the data has been saved (the first output process including steps 603 to 611 and 612 in FIG. 9), but when the second output mode is selected and when it is determined in the determination step that the data of the revised version generated by the application has not been saved, the data of the revised version is saved in the storage unit, then, after the data has been saved, newest data indicating the revision date/time acquired in the acquisition step from the storage unit is acquired, and finally the data of the revised version generated by the application is output together with the data indicating the revision date/time to the printing apparatus (the first output process including step 604 to 612 in FIG. 9).

In this method of processing data according to embodiment 10, high data processing efficiency can be achieved in the first output mode in which it is not necessary to reflect the revise date/time in the generated data. On the other hand, in the second output mode, after the data of the revised version is saved, printing is performed such that the date/time the data of the revised version was saved is included in the printed matter, thereby allowing it to identify the printed data based on the printed reverse date/time and thus allowing it to determine which data stored in the storage device was printed.

Embodiment 11

A method of processing data according to one of embodiments 7 to 10, further including the step of, when the data generated by the application and the data indicating the revise date/time are output to the printing apparatus, selecting a first page output mode in which the data generated by the application and the data indicating the revise date/time are output on different pages or a second page output mode in which the data generated by the application and the data indicating the revise date/time are output on a same page in an overlaid fashion (step 1402 in FIG. 14), wherein when the first page output mode is selected in the page output mode selection step, the control step controls the production of data such that data is output to the printing apparatus so that the data generated by the application and the data indicating the revise date/time are to be output on different pages, but when the second page output mode is selected in the page output mode selection step, data is output to the printing apparatus so that the data generated by the application and the data indicating the revise date/time are to be output on the same page in the overlaid fashion.

This method of processing data according to one of embodiment 11 allows it to select whether the revise date/time of main data of the revised version generated by the application is printed on a page separated from pages of the main data or printed on a page of the main data in an overlaid fashion. When the revise date/time is printed on a separate page, the page may be used as a certification of the contents of the pages of the main data. When the revise date/time is printed on a page of the main data in the overlaid fashion, it is possible to describe the revise date/time without needing an additional sheet, and thus without needing additional cost.

Embodiment 12

A method of processing data according to one of embodiments 7 to 11, wherein the control step controls the generation of data such that the data indicating the revise date/time is represented in a readable form and the resultant data is output to the printing apparatus.

More specifically, the revise date/time is described in characters, a bar code, or a recognizable image code.

Embodiment 13

A computer-readable storage medium on which a program for implementing a method of processing data according to one of embodiments 7 to 12 is stored.

This computer-readable storage medium allows it to implement the method of processing data according to one of embodiments 7 to 12.

Embodiment 14

A program for implementing a method of processing data according to one of embodiments 7 to 12.

This computer program allows it to implement the method of processing data according to one of embodiments 7 to 12.

Embodiment 15

An information processing apparatus including a printer driver capable of producing print information based on an output request from an application and outputting the produced print information to a printing apparatus, an acquisition unit for acquiring data indicating a revise date/time of data generated by the application and being to be printed (for example, the CPU 1 acquires the data indicating the revision date/time from the "Saved" property via the API by executing the printer driver 2003 loaded in the RAM 2 from the external memory 11 or the printing module, which is stored in the external memory 11 and which is plugged in the application), a determination unit for, when outputting of the data to be printed is requested, determining whether an output mode in which the data to be printed is output together with the data indicating the revise date/time acquired by the acquisition unit (step 603 in FIG. 9), and a print data generation unit for, when the determination unit determines that the output mode is selected, generating print data to be printed by the printing apparatus, from the data to be printed and the data indicating the revision date/time acquired by the acquisition unit (step 610 in FIG. 9).

When data processing is performed such that data is revised from time to time by executing the application, the information processing apparatus according to embodiment 15 allows it to select whether to print the revise date/time together with the data generated by the application such that the revise date/time is reflected in a resultant printed matter, thereby allowing it to easily determine whether the actually printed data is correct data intended to be printed by comparing the revise date/time of the data reflected in the resultant printed matter with the revise date/time of a file in which the data is stored.

Embodiment 16

An information processing apparatus according to embodiment 15, further including a second determination unit for, when the output request is issued, determining whether the data being generated and to be printed is of a revised version and has not been saved (by the CPU 1 in step 605 in FIG. 9), and a display control unit for prompting a user to save the data of the revised version to be printed (by displaying, for example, the display screen shown in FIG. 11 on the CRT 10), when the output mode is selected and the second determination unit determines that the data to be printed has not been saved (by the CPU 1 in step 606 in FIG. 9), wherein after confirming that the data to be printed has been saved, the print data generation unit acquires newest data indicating the revise date/time acquired by the acquisition unit from the storage unit and generating the print data to be printed by the printing apparatus from the original data to be printed and the data indicating the revise date/time.

In this information processing apparatus according to embodiment 16, when the second output mode is selected, printing is performed such the revision date/time of the data of the revised version is reflected in the printed result of the data of the revised version, that is, after the data of the revised version is saved, and printing is performed such that the date/time the data of the revised version was saved is included in the printed matter. This makes it possible to prevent the revision date/time of data of a previous version from being employed by mistake as the revision date/time of the data of the revised version, and thus it becomes possible to prevent an incorrect revision date/time from being printed.

Embodiment 17

A method of processing data in an information processing apparatus including a printer driver capable of generating print information in accordance with an output request issued by an application and supplying the generated print information to a printing apparatus, including the steps of acquiring data indicating a revise date/time of data generated by the application and being to be printed (for example, the CPU 1 acquires the data indicating the revision date/time from the "Saved" property via the API by executing the printer driver 2003 loaded in the RAM 2 from the external memory 11 or the printing module, which is stored in the external memory 11 and which is plugged in the application, in step 604 in FIG. 9), when outputting of the data to be printed is requested, determining whether an output mode in which the data to be printed is output together with the data indicating the revise date/time acquired in the acquisition step (step 603 in FIG. 9), and when it is determined in the determination step that the output mode is selected, generating print data to be printed by the printing apparatus, from the original data to be printed and the data indicating the revision date/time acquired in the acquisition step (step 610 in FIG. 9).

When data processing is performed such that data is revised from time to time by executing the application, the method of processing data according to embodiment 17 allows it to select whether to print the revise date/time together with the data generated by the application such that the revise date/time is reflected in a resultant printed matter, thereby allowing it to easily determine whether the actually printed data is correct data intended to be printed by comparing the revise date/time of the data reflected in the resultant printed matter with the revise date/time of a file in which the data is stored.

Embodiment 18

A method of processing data, according to embodiment 17, further including a second determination step of, when the output request is issued, determining whether the data being generated and to be printed is of a revised version and has not been saved (step 605 in FIG. 9), and a display control step of prompting a user to save the data of the revised version to be printed, when the output mode is selected and it is determined in the second determination step that the data to be printed has not been saved (step 609 in FIG. 9), wherein the print data generation step includes, after confirming that the data to be printed has been saved, acquiring newest data indicating the revise date/time acquired in the acquisition step from the storage unit and generating the print data to be printed by the printing apparatus from the original data to be printed and the data indicating the revise date/time.

In the method of processing data according to embodiment 18, when the second output mode is selected, printing is performed such the revision date/time of the data of the revised version is reflected in the printed result of the data of the revised version, that is, after the data of the revised version is saved, and printing is performed such that the date/time the data of the revised version was saved is included in the printed matter. This makes it possible to prevent the revision date/time of data of a previous version from being employed by mistake as the revision date/time of the data of the revised version, and thus it becomes possible to prevent an incorrect revision date/time from being printed.

As many apparently widely different embodiments of the present invention can be made without departing from the spirit and scope thereof, it is to be understood that the invention is not limited to the specific embodiments thereof except as defined in the appended claims.

As described above, according to an embodiment of the invention, when data processing is performed such that data is revised from time to time by executing the application, it is allowed to select whether to print the revise date/time together with the data generated by the application such that the revise date/time is reflected in a resultant printed matter, thereby allowing it to easily determine whether the actually printed data is correct data intended to be printed by comparing the revise date/time of the data reflected in the resultant printed matter with the revise date/time of a file in which the data is stored.

According to an embodiment of the invention, it is allowed to select whether the revise date/time of main data of the revised version generated by the application is printed on a page separated from pages of the main data or printed on a page of the main data in an overlaid fashion. When the revise date/time is printed on a separate page, the page may be used as a certification of the contents of the pages of the main data. When the revise date/time is printed on a page of the main data in the overlaid fashion, it is possible to describe the revise date/time without needing an additional sheet, and thus without needing additional cost.

An embodiment of the invention provides an output mode in which printing is performed such the revision date/time of the data of the revised version is reflected in the printed result of the data of the revised version, that is, after the data of the revised version is saved, and printing is performed such that the date/time the data of the revised version was saved is included in the printed matter. This makes it possible to prevent the revision date/time of data of a previous version from being employed by mistake as the revision date/time of the data of the revised version, and thus it becomes possible to prevent an incorrect revision date/time from being printed.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-166944 filed Jun. 4, 2004, which is hereby incorporated by reference herein.

What is claimed is:

1. An information processing apparatus including a processor and a printer driver capable of generating print data in accordance with an output request issued by an application and supplying the generated print data to a printing apparatus, the information processing apparatus comprising:

a storage unit configured to store a first application data generated by an application;

a first displaying unit configured to display a screen including both an image of second application data and a designation button to display a designation screen to designate printing of a vision date/time indicating a date/time when the second application data is updated after the application updates the first application data stored in the storage unit with the second application data being different from the first application data;

a second displaying unit configured to display the designation screen in accordance with an instruction input via the screen;

a designation unit configured to designate to print the second application data together with the revision date/time of the second application data in accordance with an instruction input via the designation screen a determination unit configured to determine whether the second application data updated by the application is stored in the memory when the designation unit designates to print the second application data together with the revision date/time;

a third displaying unit configured to display a selecting screen to select either, a saving and printing function where the second application data is printed after the second application data which is not stored is stored in the storage unit or a canceling function which cancels printing the second application data, when the determining unit determines that the second application data is not stored;

a command unit configured to command the application to store the second application data in the storage unit when the saving and printing function is selected in accordance with an instruction received via the selecting screen a sending unit configured to send the print data to print the second application data and a bar code based on the revision date/time of the second application data to the printing apparatus, when the application stores the second application data in accordance with the command of the command unit; and a retrieving unit configured to retrieve application data corresponding to the bar code when the bar code is read.

2. A method of processing data in an information processing apparatus including a printer driver capable of producing print data based on an output request from an application and outputting the produced print information to a printing apparatus, and also including a storage unit configured to store data generated by the application together with data indicating a revision date/time, the method comprising:

storing, on a storage unit, a first application data generated by an application;

displaying a screen including both an image of second application data and a designation button to display a designation screen to designate printing of a revision date/time indicating a date/time when the second application data is updated after the application updates the first application data stored in the storage unit with the second application data being different from the first application data;

displaying the designation screen in accordance with an instruction input via the screen;

designating to print the second application data together with the revision date/time in accordance with an instruction input via the designation screen:

determining whether the second application data updated by the application is stored in the memory when the second application data is printed together with the revision/time;

displaying a selecting screen to select either, a saving function and printing function where the second application data is printed after the second application data which is not stored in the storage unit or a canceling function which cancels printing the second application data, when the determining unit determines that the second application data is not stored;

commanding the application to store the second application data in the storage unit when the saving and printing function is selected in accordance with an instruction received via the selecting screen;

sending the print data to print the second application data and a bar code based on the revision date/time of the second application data to the printing apparatus when the application stores the second application data in accordance with the commanding step; and retrieving application data corresponding to the bar code when the bar code is read.

3. A computer-readable storage medium storing a computer-executable process, the computer executable process causing a computer to implement the method of claim 2.

* * * * *